US012013627B2

(12) United States Patent
Feng et al.

(10) Patent No.: US 12,013,627 B2
(45) Date of Patent: *Jun. 18, 2024

(54) INTEGRATED ILLUMINATION-AIMER IMAGING APPARATUSES

(71) Applicant: Hand Held Products, Inc., Fort Mill, SC (US)

(72) Inventors: Chen Feng, Snohomish, WA (US); Tao Xian, Mount Laurel, NJ (US); Gregory Mark Rueblinger, Stratford, NJ (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/940,712

(22) Filed: Sep. 8, 2022

(65) Prior Publication Data

US 2023/0004077 A1  Jan. 5, 2023

Related U.S. Application Data

(63) Continuation of application No. 17/240,455, filed on Apr. 26, 2021, now Pat. No. 11,467,478, which is a (Continued)

(51) Int. Cl.
*G03B 21/20* (2006.01)
*G03B 21/14* (2006.01)
*G06K 7/00* (2006.01)

(52) U.S. Cl.
CPC ....... *G03B 21/2046* (2013.01); *G03B 21/142* (2013.01); *G03B 21/2033* (2013.01); *G03B 21/2066* (2013.01); *G06K 7/00* (2013.01)

(58) Field of Classification Search
CPC .... G03B 21/14; G03B 21/142; G03B 21/145; G03B 21/208; G03B 21/2013;
(Continued)

(56) References Cited

U.S. PATENT DOCUMENTS 6,179,208 B1   1/2001   Feng
9,076,054 B2   7/2015   Hennick et al.
(Continued)

FOREIGN PATENT DOCUMENTS

EP   2916259 A1   9/2015
GB   2572241 A    9/2019

OTHER PUBLICATIONS

U.S. Appl. No. 16/684,124, filed Nov. 14, 2019, U.S. Pat. No. 11,009,786, Patented.
(Continued)

*Primary Examiner* — Sultan Chowdhury
(74) *Attorney, Agent, or Firm* — Alston & Bird LLP

(57) ABSTRACT

Various embodiments described herein provide multi-projector (i.e., two or more) imaging apparatuses utilizing integrated illumination-aimer optics. Embodiments of the present disclosure minimize irreparable component offset to improve overall accuracy associated with the functioning of the apparatuses. Additionally, the integrated illumination-aimer optics enables embodiments disclosed herein to be provided in a significantly smaller form factor than conventional multi-projector imaging apparatuses. An example apparatus includes a near-field imaging lens and a far-field imaging lens, an integrated illumination-aimer optics positioned between the near-field imaging lens and the far-field imaging lens, a near-field illuminator source and a far-field illuminator source positioned for projecting via the integrated illumination-aimer optics, a near-field imaging sensor associated with the near-field imaging lens, a far-field imaging sensor associated with the far-field imaging lens, and an apparatus chassis to align the various components for operation.

18 Claims, 14 Drawing Sheets

Related U.S. Application Data continuation of application No. 16/684,124, filed on Nov. 14, 2019, now Pat. No. 11,009,786.

(58) Field of Classification Search
CPC ............ G03B 21/2033; G03B 21/2046; G03B 21/2056; G03B 21/2066; G06K 9/22; G06K 9/24; G06K 9/32; G06K 9/209; G06K 9/228; G06K 9/2027; G06K 7/00; G06K 7/089; G06K 7/10138; G06K 7/10554; G06K 7/10683; G06K 7/10722; G06K 7/10742; G06K 7/10831; G06K 7/10861; G06K 7/10881; H04N 2201/04703; H04N 2201/04712; H04N 2201/04734; H04N 2201/04743
See application file for complete search history.

(56) References Cited

U.S. PATENT DOCUMENTS

| | | | |
|---|---|---|---|
| 11,009,786 B1 | 5/2021 | Feng et al. | |
| 11,467,478 B2 | 10/2022 | Feng et al. | |
| 2003/0019934 A1 | 1/2003 | Hunter et al. | |
| 2003/0156303 A1* | 8/2003 | Schnee | G06V 10/12 358/509 |
| 2007/0205288 A1 | 9/2007 | Laser | |
| 2009/0272808 A1 | 11/2009 | Drzymala et al. | |
| 2012/0099308 A1 | 4/2012 | Brukilacchio | |
| 2012/0142989 A1 | 6/2012 | Jaber et al. | |
| 2013/0070322 A1 | 3/2013 | Fritz et al. | |
| 2013/0161397 A1 | 6/2013 | Bremer et al. | |
| 2014/0104416 A1 | 4/2014 | Giordano et al. | |
| 2015/0334870 A1 | 11/2015 | Feng et al. | |
| 2016/0054662 A1* | 2/2016 | Wolf | G03F 7/70891 355/52 |
| 2016/0300090 A1* | 10/2016 | Gifford | G06K 7/1443 |
| 2017/0270329 A1 | 9/2017 | Handshaw et al. | |
| 2017/0336714 A1* | 11/2017 | Arnz | G03F 7/70266 |
| 2019/0188432 A1* | 6/2019 | Lozano | G06K 7/10801 |
| 2019/0294840 A1 | 9/2019 | Drzymala et al. | |

OTHER PUBLICATIONS

U.S. Appl. No. 17/240,455, filed Apr. 26, 2021, U.S. Pat. No. 11,467,478, Patented.

European Search Report received for European Patent Application No. 20206997.7, dated Feb. 4, 2021, 7 pages.

Non-Final Office Action received for U.S. Appl. No. 17/240,455, dated Jan. 11, 2022, 15 pages.

Notice of Allowance received for Chinese Patent Application No. 202011282567, dated Oct. 17, 2022, 2 pages (English Translation only).

Notice of Allowance received for Chinese Patent Application No. 202011282567, dated Oct. 17, 2022, 4 pages.

Notice of Allowance received for U.S. Appl. No. 16/684,124, dated Jan. 21, 2021, 15 pages.

Notice of Allowance received for U.S. Appl. No. 17/240,455, dated Jun. 8, 2022, 12 pages.

Office Action received for Chinese Patent Application No. 202011282567, dated Feb. 21, 2022, 6 pages (English Translation only).

Office Action received for Chinese Patent Application No. 202011282567, dated Feb. 21, 2022, 5 pages.

Intention to grant dated May 25, 2023 for EP Application No. 20206997, 9 page(s).

Decision to grant a European patent Mailed Sep. 28, 2023 for EP Application No. 20206997, 2 page(s).

Extended European Search Report Mailed on Jan. 8, 2024 for EP Application No. 23198661, 10 page(s).

* cited by examiner

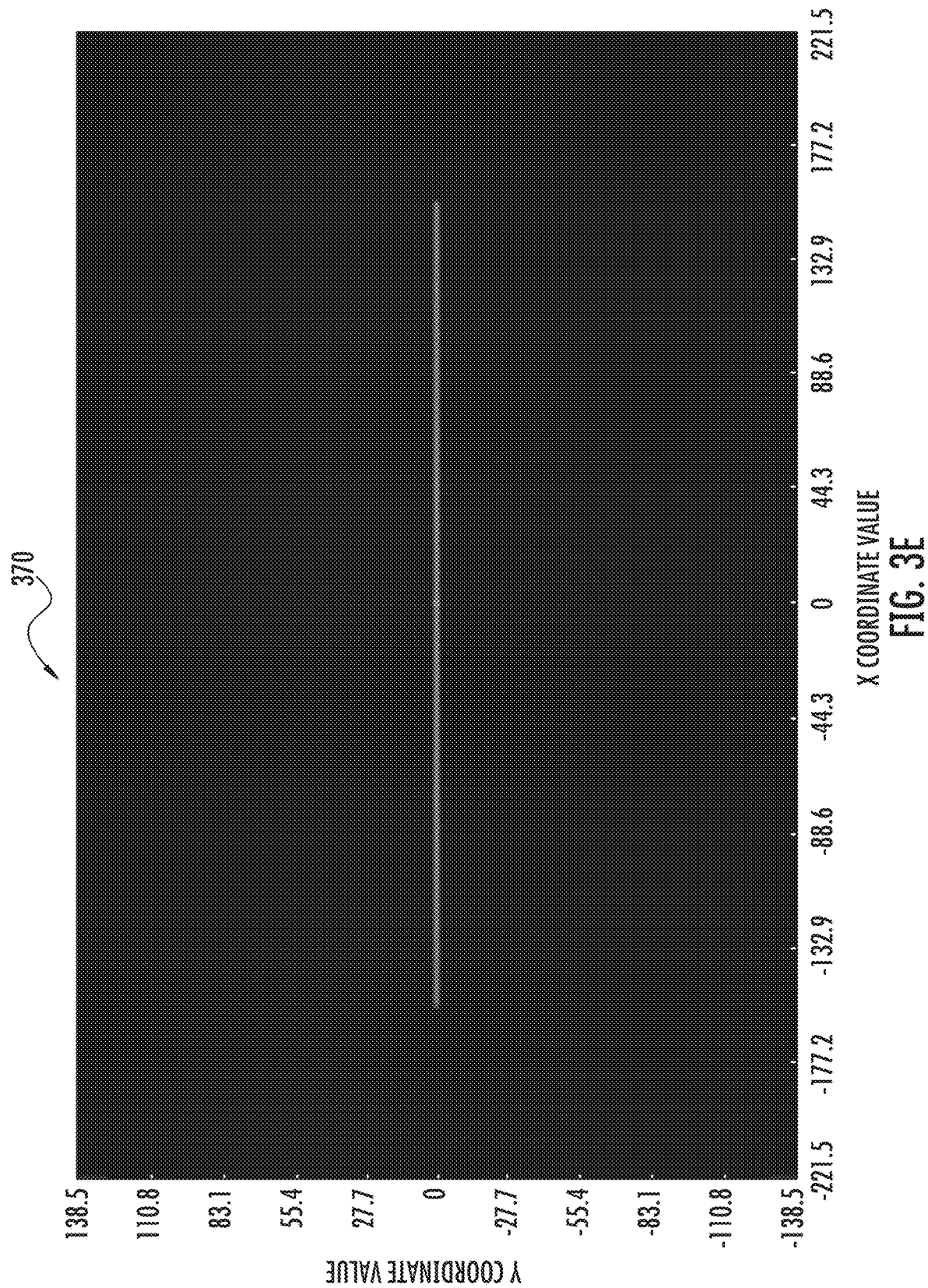

INTEGRATED ILLUMINATION-AIMER IMAGING APPARATUSES

CROSS-REFERENCE TO RELATED APPLICATIONS

This application is a continuation of and claims priority to U.S. application Ser. No. 17/240,455 filed Apr. 26, 2021, titled "INTEGRATED ILLUMINATION-AIMER IMAGING APPARATUSES," which claims priority to U.S. application Ser. No. 16/684,124 filed Nov. 14, 2019, titled "INTEGRATED ILLUMINATION-AIMER IMAGING APPARATUSES," the contents of which are incorporated herein by reference in their entirety.

TECHNOLOGICAL FIELD

Embodiments of the present disclosure generally relate to imaging apparatuses, for example scanning engines, and specifically to dual-projector or multi-projector imaging apparatuses including an integrated illumination-aimer optics and corresponding chassis support fittings.

BACKGROUND

Imaging apparatuses include various components for projecting one or more illumination patterns onto a particular illumination field, and capturing and/or analyzing images of the illuminated field. Conventional apparatuses include a first illuminating lens for far-field illumination, a second illuminating lens for near-field illumination, and an aimer lens for projection of an aimer pattern, as well as individual supporting structures for each component. Applicant has discovered problems with current imaging apparatuses, and through applied effort, ingenuity, and innovation, Applicant has solved many of these identified problems by developing a solution that is embodied in the present disclosure, which is described in detail below.

BRIEF SUMMARY

In general, embodiments of the present disclosure provided herein include integrated illumination-aimer imaging apparatuses. Embodiment integrated illumination-aimer imaging apparatuses include a single-piece, integrated illumination-aimer optics optical component including at least one or more illumination lens (e.g., a near-field illumination lens and a far-field illumination lens) and an aimer pattern projection optics, as well as one or more corresponding support structures for supporting the single-piece integrated illumination-aimer optical component. Other systems, apparatuses, methods, computer readable media, and features will be, or will become, apparent to one with skill in the art upon examination of the following figures and detailed description. It is intended that all such additional systems, apparatuses, methods, computer readable media, and features be included within this description be within the scope of the disclosure, and be protected by the following claims.

In accordance with one aspect of the present disclosure, an integrated illumination-aimer imaging apparatus is provided. In some example embodiments, the integrated illumination-aimer imaging apparatus is provided in a smaller form factor than conventional imaging apparatuses. In at least one example embodiment of the apparatus, the integrated illumination-aimer imaging apparatus includes a near-field imaging lens and a far-field imaging lens. The example integrated illumination-aimer imaging apparatus further includes an integrated illumination-aimer optics positioned between the near-field imaging lens and the fear-field imaging lens. The example integrated illumination-aimer imaging apparatus further includes a near-field illuminator source and a far-field illuminator source, each positioned for projecting via the integrated illumination-aimer optics. The example integrated illumination-aimer imaging apparatus further includes a near-field imaging sensor associated with the near-field imaging lens. The example integrated illumination-aimer imaging apparatus further includes a far-field imaging sensor associated with the far-field imaging lens. The example integrated illumination-aimer imaging apparatus further includes an apparatus chassis to align the near-field imaging lens with the near-field imaging sensor, align the far-field imaging lens with the far-field imaging sensor, and align the near-field illuminator source and the far-field illuminator source with the integrated illumination-aimer optics.

Additionally or alternatively, in some embodiments of the example integrated illumination-aimer imaging apparatus, the integrated illumination-aimer optics includes a near-field illumination projection lens positioned adjacent to the far-field imaging lens, and a far-field illumination projection lens positioned adjacent to the near-field imaging lens.

Additionally or alternatively, in some embodiments of the example integrated illumination-aimer imaging apparatus, the integrated illumination-aimer optics includes a near-field illumination projection lens positioned adjacent to the far-field imaging lens, a far-field illumination projection lens positioned adjacent to the near-field imaging lens, and aimer pattern projection optics.

Additionally or alternatively, in some embodiments of the example integrated illumination-aimer imaging apparatus, the apparatus chassis comprises a near-field lens securing rim for engaging the near-field imaging lens.

Additionally or alternatively, in some embodiments of the example integrated illumination-aimer imaging apparatus, the apparatus chassis comprises a far-field lens securing rim for engaging the far-field imaging lens.

Additionally or alternatively, in some embodiments of the example integrated illumination-aimer imaging apparatus, the near-field imaging lens includes a front end and a back end, the front end of the near-field imaging lens is associated with a near-field lens front end radius, the back end of the near-field imaging lens is associated with a near-field lens back end radius, and the near-field lens front end radius is smaller than the near-field lens back end radius.

Additionally or alternatively, in some embodiments of the example integrated illumination-aimer imaging apparatus, the far-field imaging lens includes a front end and a back end, the front end of the far-field imaging lens is associated with a far-field lens front end radius, the back end of the far-field imaging lens is associated with a far-field lens back end radius, and the far-field lens front end radius is smaller than the far-field lens back end radius.

Additionally or alternatively, in some embodiments of the example integrated illumination-aimer imaging apparatus, the integrated illumination-aimer optics is coated with an anti-reflective coating.

Additionally or alternatively, in some embodiments of the example integrated illumination-aimer imaging apparatus, the apparatus chassis is fixedly positioned within a mobile device chassis.

Additionally or alternatively, in some embodiments of the example integrated illumination-aimer imaging apparatus, the integrated illumination-aimer imaging apparatus further includes an aimer source integrated with the apparatus chassis to align the aimer source with the integrated illumination-aimer optics.

Additionally or alternatively, in some embodiments of the example integrated illumination-aimer imaging apparatus, the integrated illumination-aimer optics includes a rounded near-field illumination projection lens associated with a first defined curvature, and a rounded far-field illumination projection lens associated with a second defined curvature.

Additionally or alternatively, in some embodiments of the example integrated illumination-aimer imaging apparatus, the near-field illuminator source comprises a first LED, and the far-field illuminator source comprises a second LED.

Additionally or alternatively, in some embodiments of the example integrated illumination-aimer imaging apparatus, the near-field illuminator source is configured for projecting a near-field illumination pattern associated with a near-field illumination pattern projection size, the far-field illuminator source is configured for projecting a far-field illumination pattern associated with a far-field illumination pattern projection size, and the near-field illumination pattern projection size is greater than the far-field illumination pattern projection size in at least one direction.

Additionally or alternatively, in some embodiments of the example integrated illumination-aimer imaging apparatus, the near-field illuminator source, the far-field illuminator source, the near-field imaging sensor, and the far-field imaging sensor are fixedly attached to a printed circuit board configured for interlocking with the apparatus chassis for positioning and alignment.

Additionally or alternatively, in some embodiments of the example integrated illumination-aimer imaging apparatus, the integrated illumination-aimer imaging apparatus further includes a protective window secured to the apparatus chassis, the protective window positioned in front of the near-field imaging lens, the far-field imaging lens, and the integrated illumination-aimer optics. In some such embodiments, the protective window is coated with an anti-reflective coating.

In accordance with yet another aspect of the disclosure, an integrated illumination-aimer optics are provided. The integrated illumination-aimer optics may comprise a plurality of sub-assemblies, and may be injection molded to form a single piece. In at least one example embodiment, the example integrated illumination-aimer optics includes a near-field illumination projection lens. Additionally or alternatively, in some embodiments, the integrated illumination-aimer optics further includes a far-field illumination projection lens adjacent to the near-field illumination projection lens. Additionally or alternatively, in some embodiments, the integrated illumination-aimer optics further includes aimer pattern projection optics aligned with an aimer collimating lens, the aimer pattern projection optics and the aimer collimating lens positioned below the near-field illumination projection lens.

Additionally or alternatively, in some embodiments of the example integrated illumination-aimer optics, the integrated illumination-aimer optics further includes an aimer collimating lens integrated with the aimer pattern projection optics.

Additionally or alternatively, in some embodiments of the example integrated illumination-aimer optics, the integrated illumination-aimer optics includes one or more additional projection lenses arranged in a designed arrangement. For example, in some embodiments, the example integrated illumination-aimer optics further includes three or more total projection lenses.

In accordance with yet aspect of the present disclosure, another integrated illumination-aimer imaging apparatus is provided. In some example embodiments, the integrated illumination-aimer imaging apparatus is provided in a smaller form factor than conventional imaging apparatuses. In at least one example embodiment of the apparatus, the integrated illumination-aimer imaging apparatus includes a near-field imaging lens and a far-field imaging lens. The example integrated illumination-aimer imaging apparatus further includes an integrated illumination-aimer optics comprising a near-field illumination projection lens and a far-field illumination projection lens. The example integrated illumination-aimer imaging apparatus further includes an apparatus chassis to align the near-field imaging lens with a near-field imaging sensor, align the far-field imaging lens with a far-field imaging sensor, align a near-field illuminator source with the near-field illumination projection lens of the integrated illumination-aimer optics, and align a far-field illuminator source with the far-field illumination projection lens of the integrated illumination-aimer optics, where the near-field illumination projection lens is positioned at a threshold distance from the near-field imaging lens and the far-field illumination projection lens is positioned at the threshold distance from the far-field imaging lens.

Additionally or alternatively, in some example embodiments of the example integrated illumination-aimer imaging apparatus, the integrated illumination-aimer optics further comprises at least one additional illumination projection lens, and wherein the apparatus chassis further aligns each of at least one additional imaging lens with one of at least one additional imaging sensor, and aligns each of at least one additional illuminator source with one of the at least one additional illumination projection lens of the integrated illumination-aimer optics.

Additionally or alternatively, in at least some example embodiments of the example integrated illumination-aimer imaging apparatus, each of the at least one additional imaging lens is positioned at a threshold distance from one of the at least one additional illumination projection lens of the integrated illumination-aimer optics.

BRIEF DESCRIPTION OF THE DRAWINGS

Figure 1A:
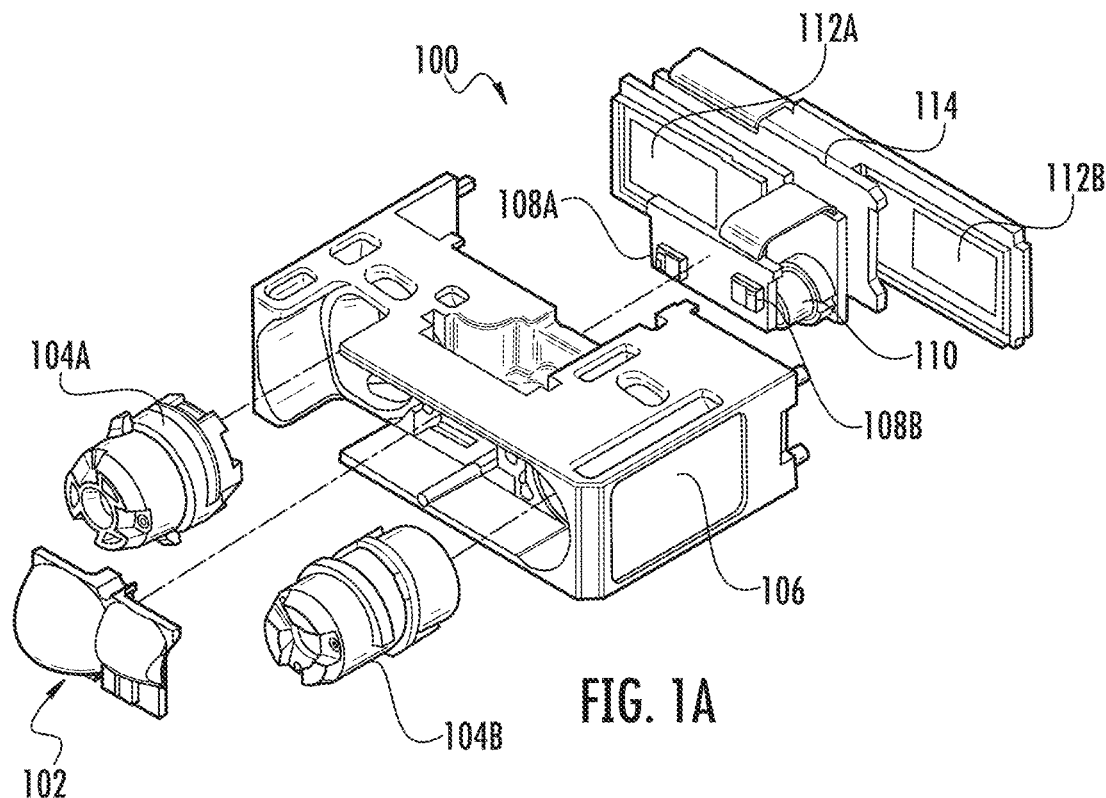
Figure 1B:
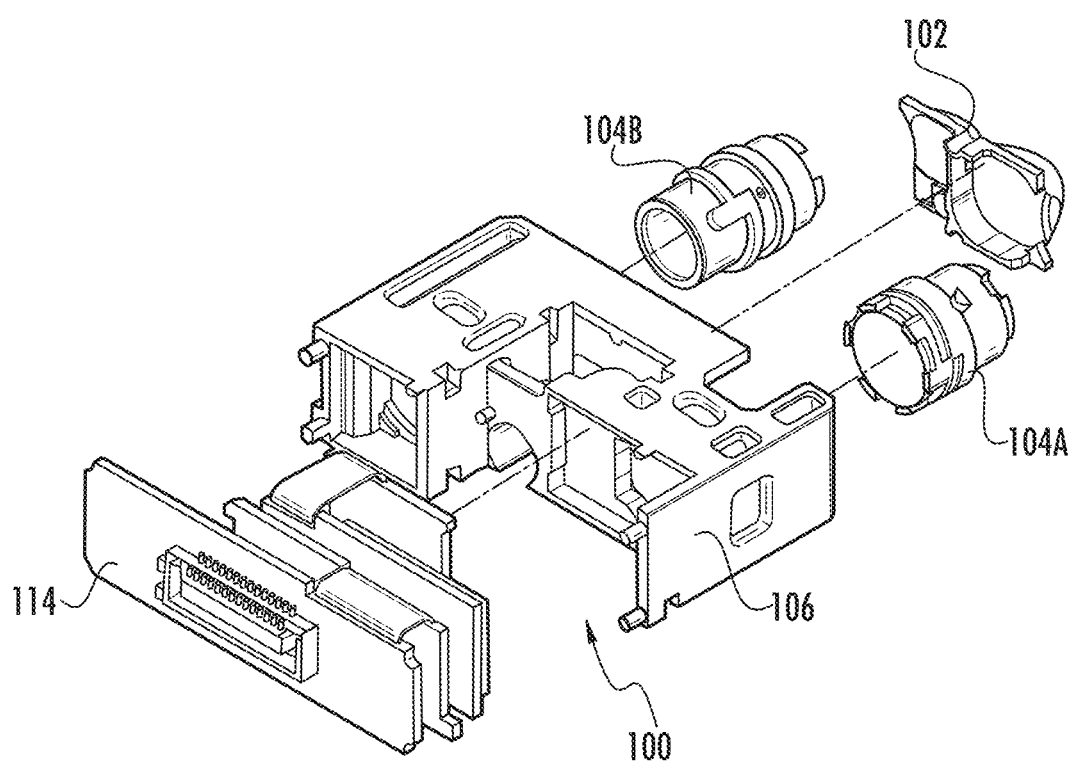
Figure 3A:
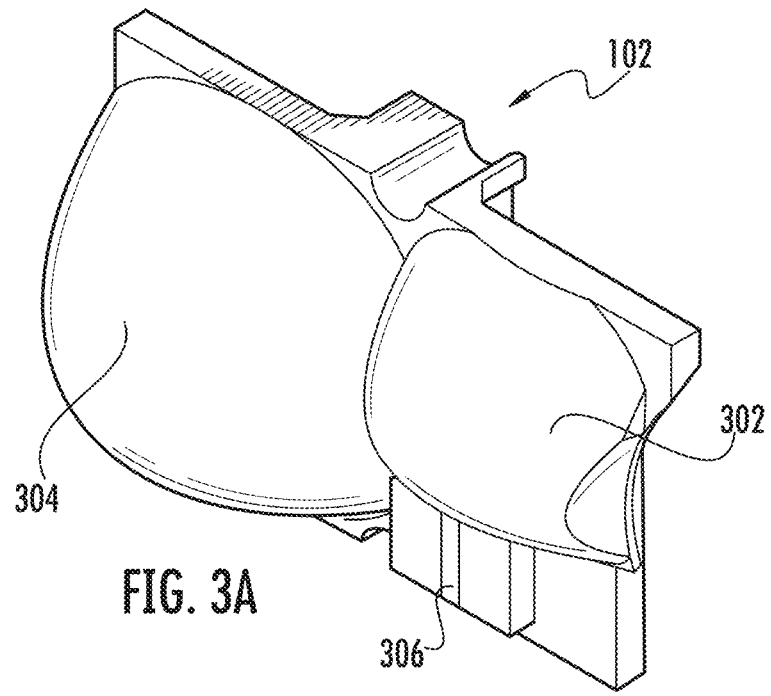
Figure 3B:
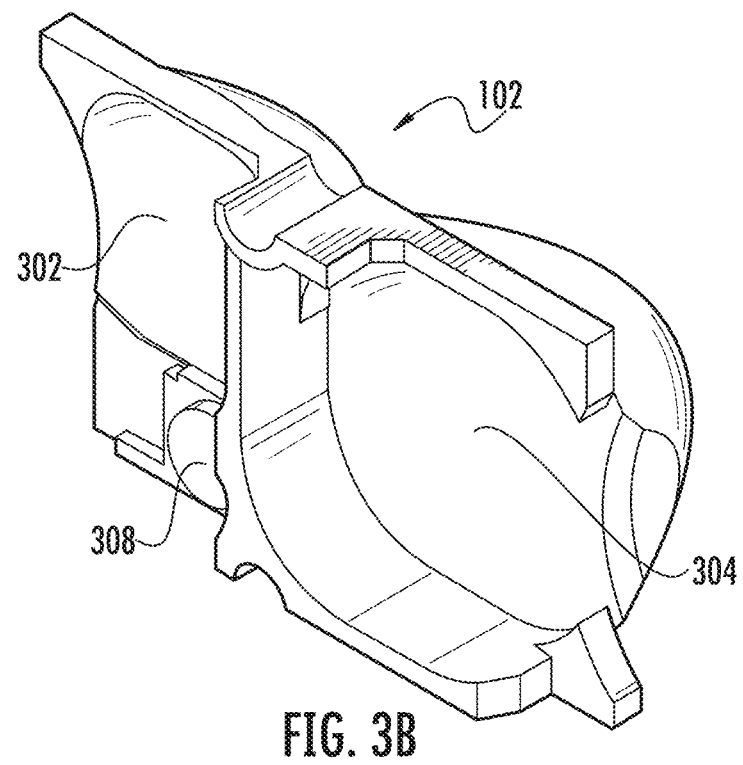
Figure 3C:
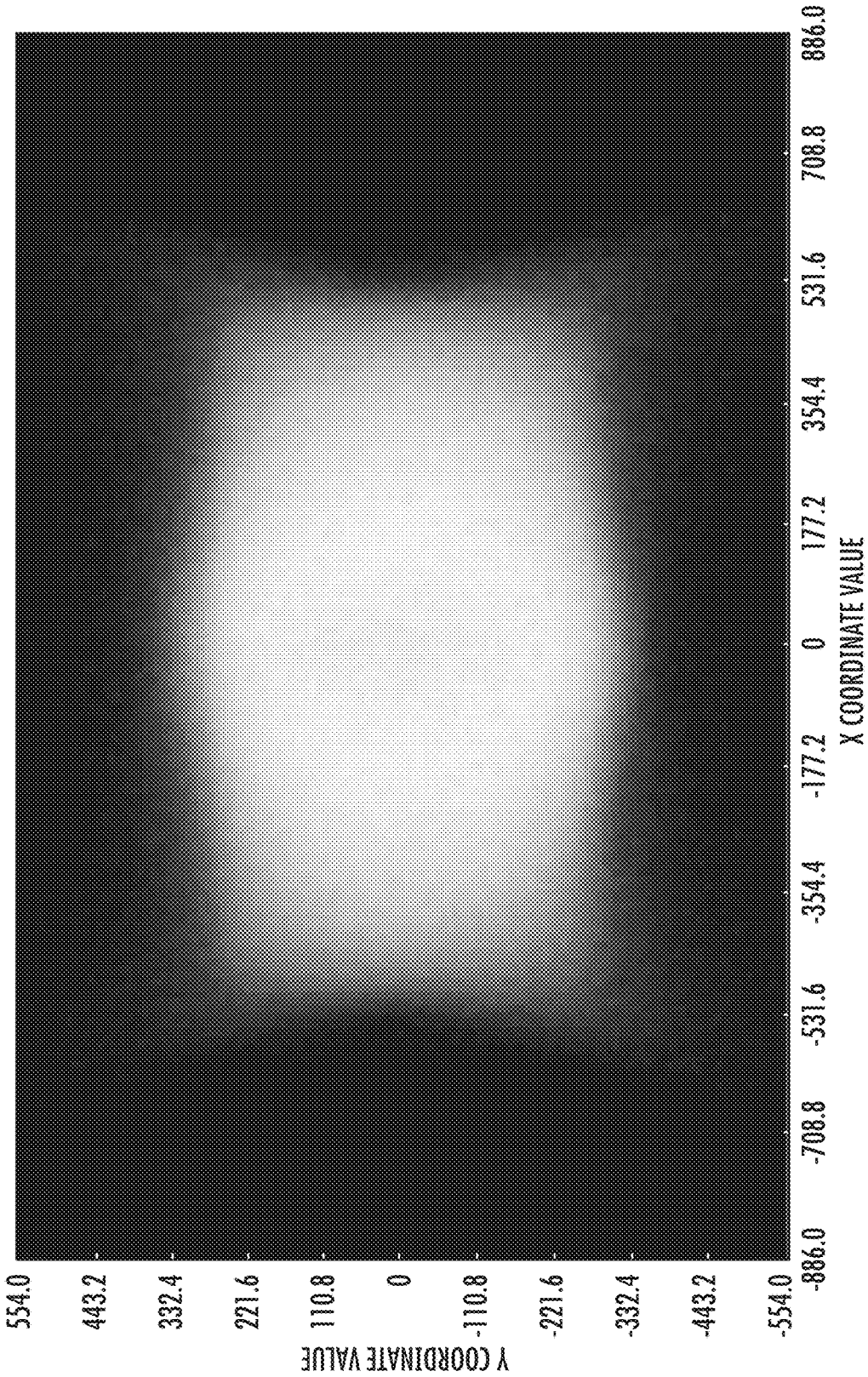
Figure 3D:
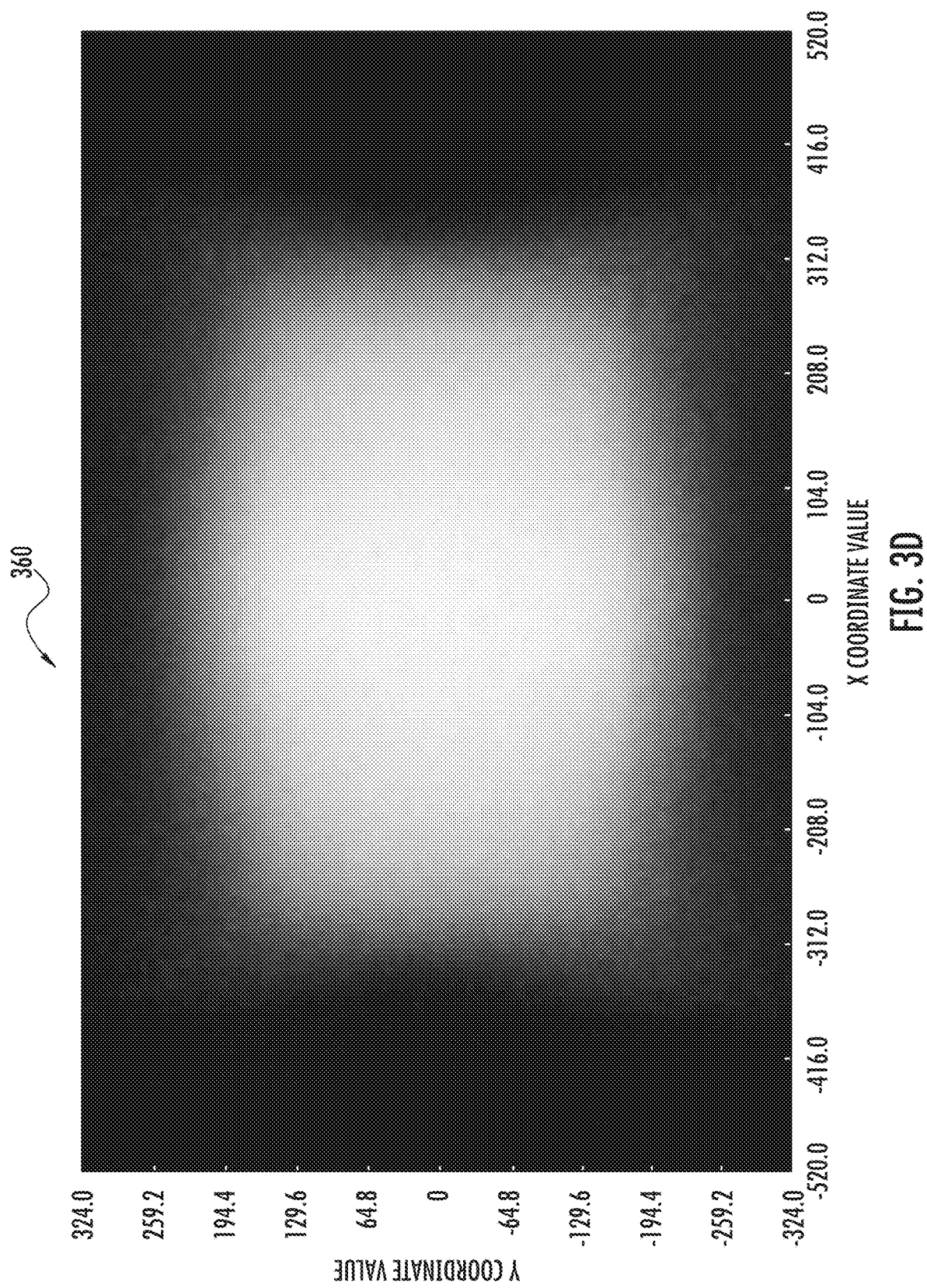
Figure 4A:
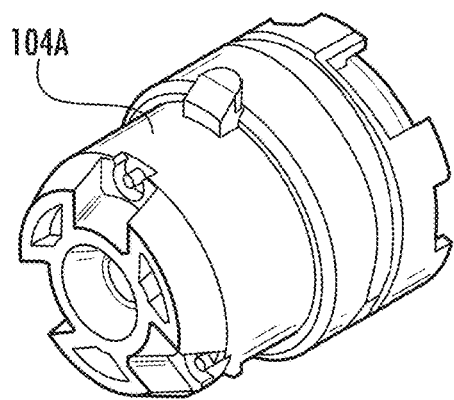
Figure 4B:
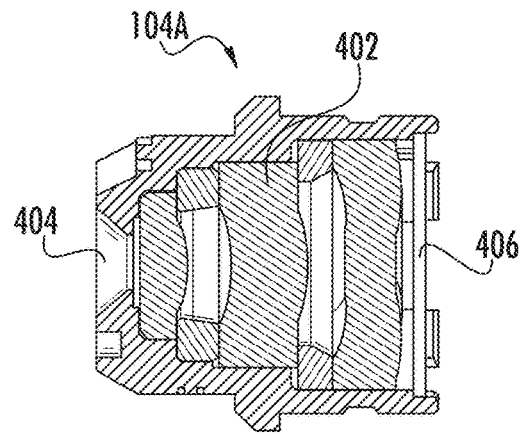
Figure 5A:
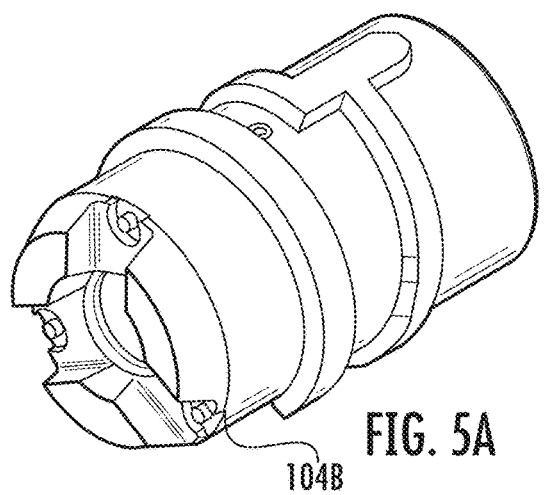
Figure 5B:
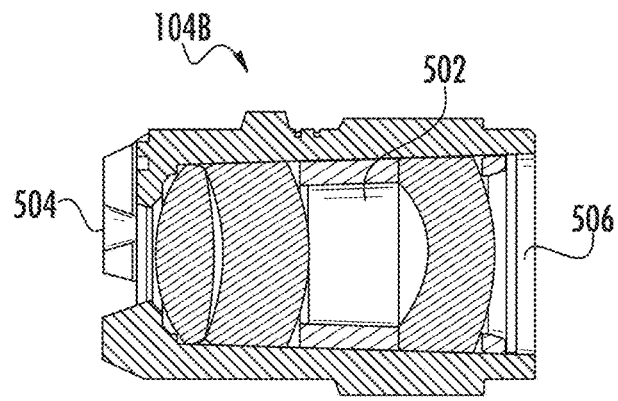
Figure 7:
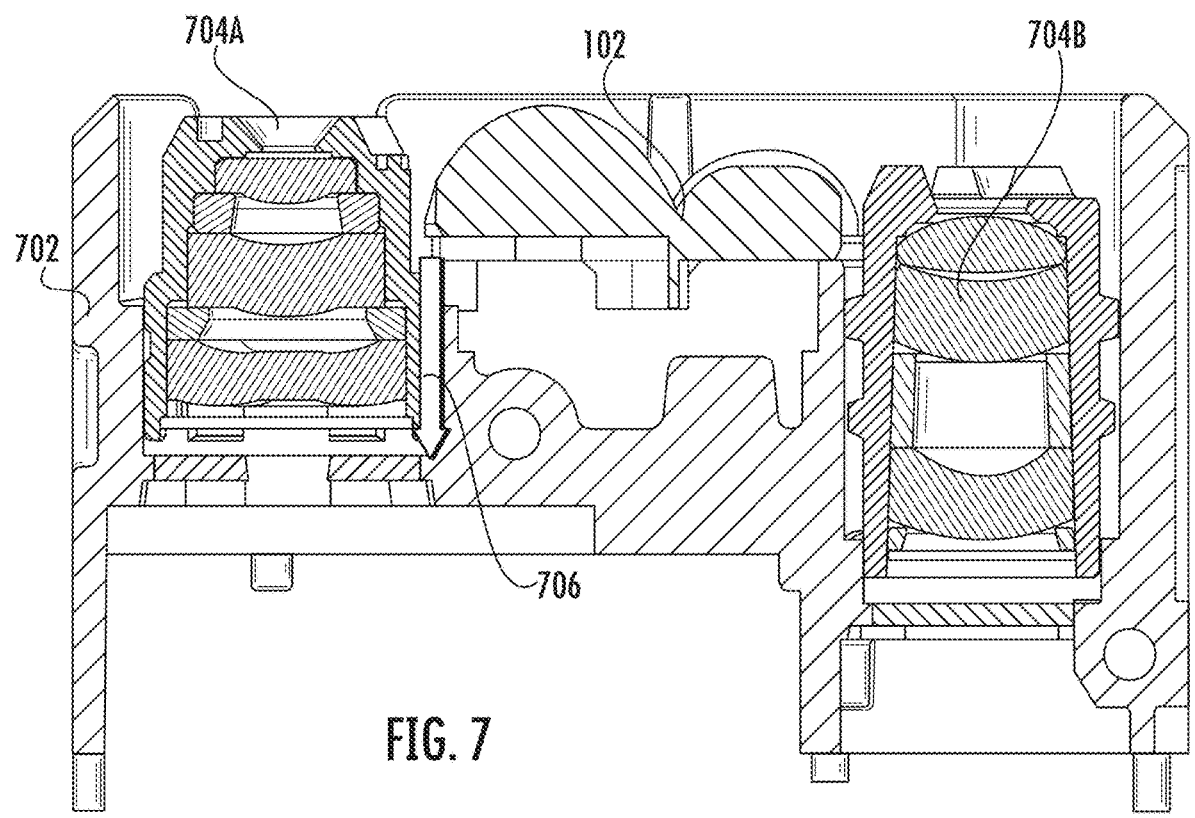
Figure 8:
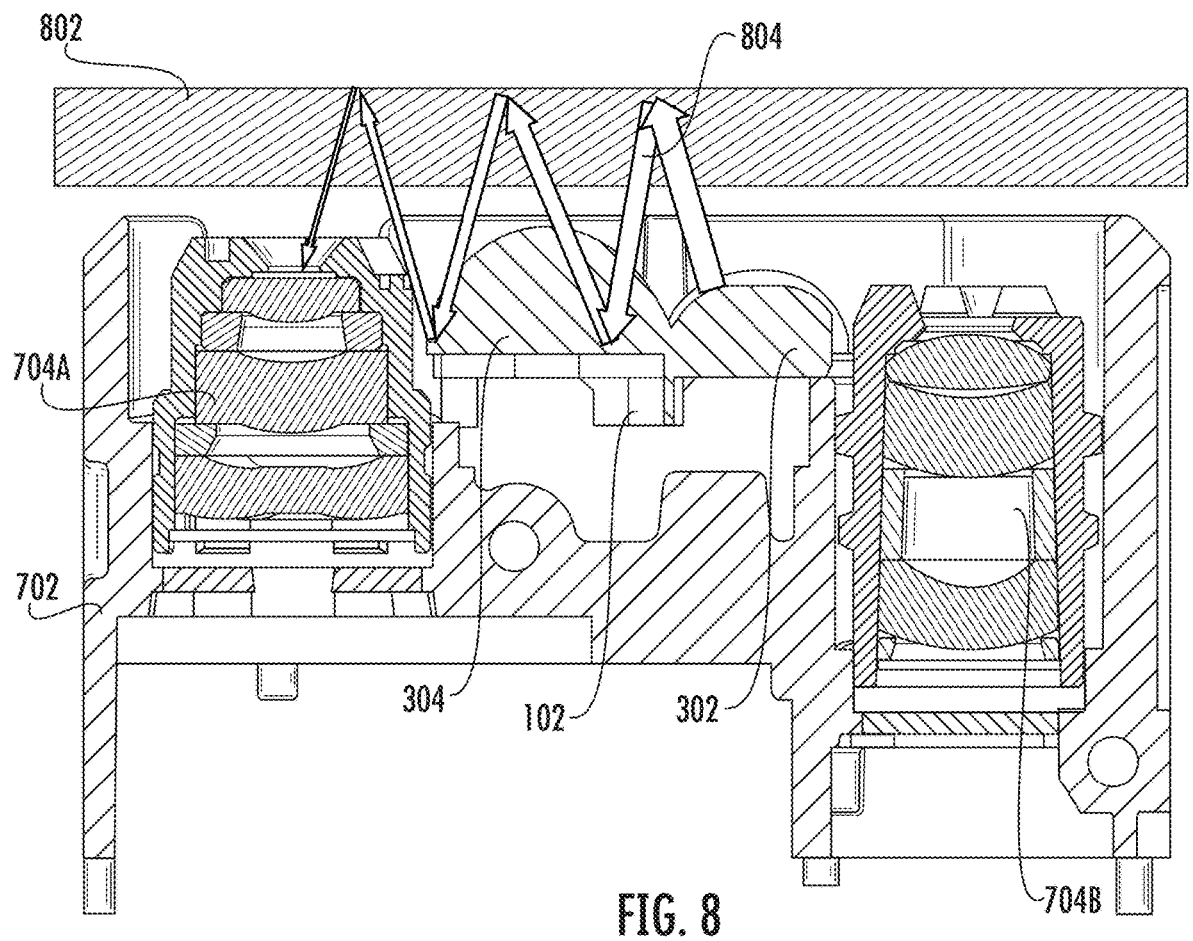
Figure 9A:
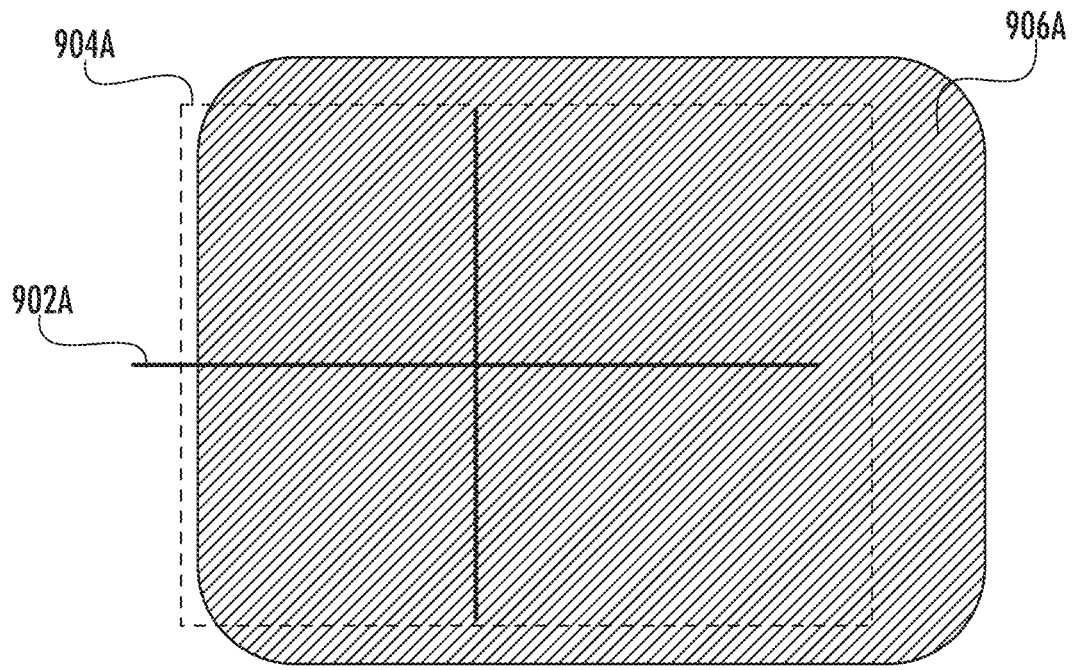
Figure 9B:
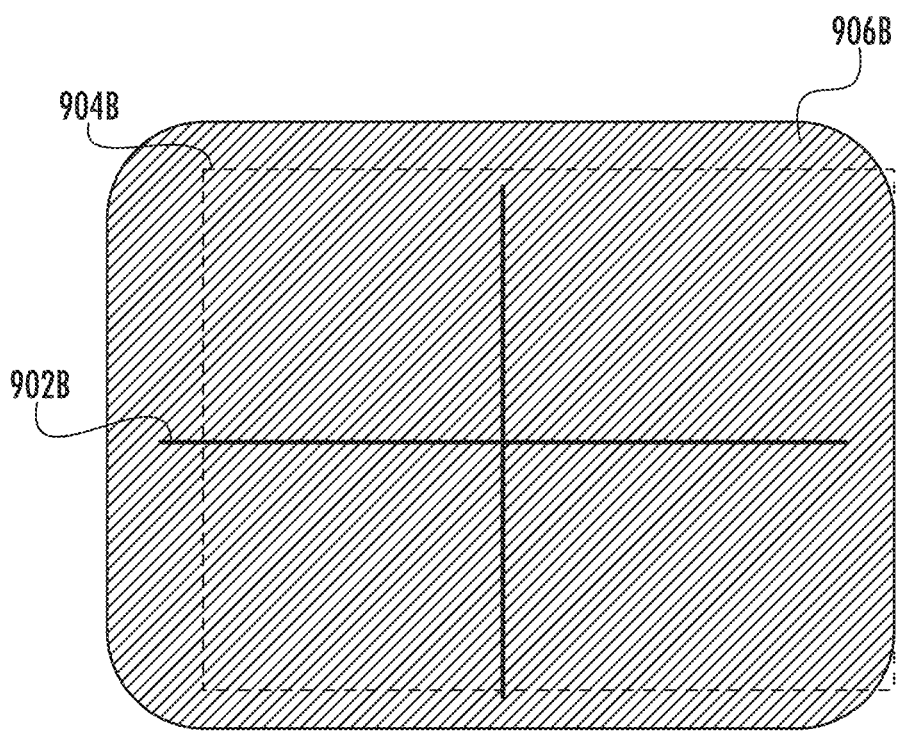
Figure 10A:
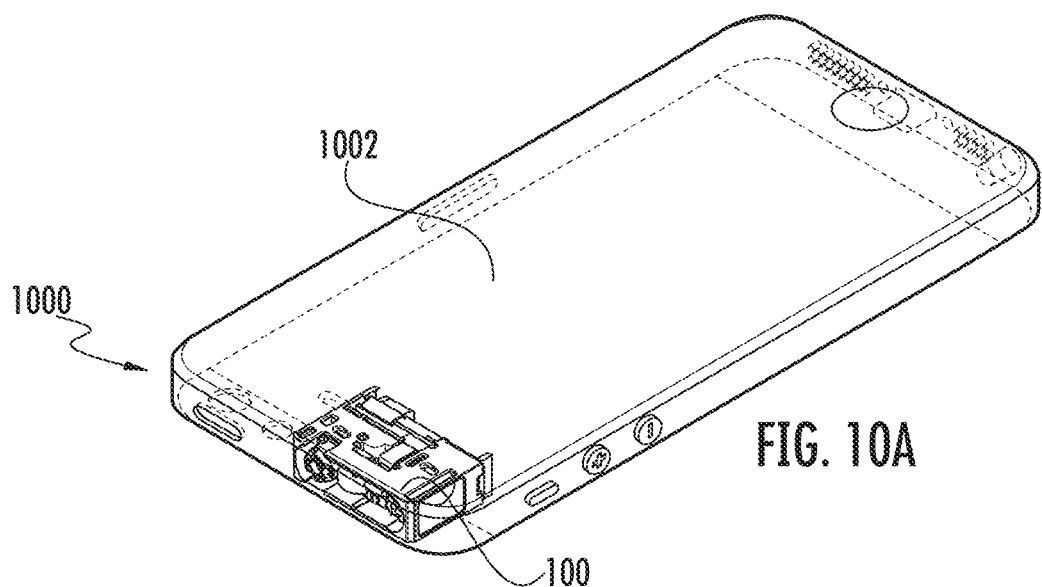
Figure 10B:
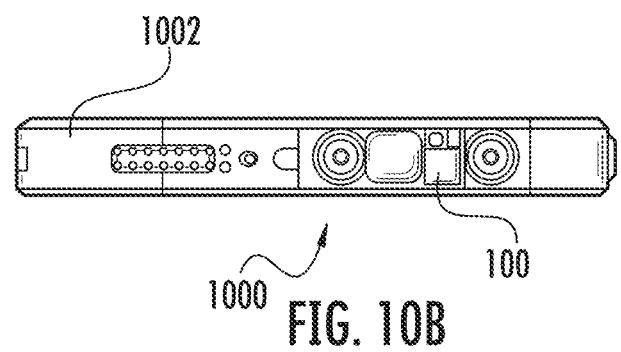
Figure 10C:
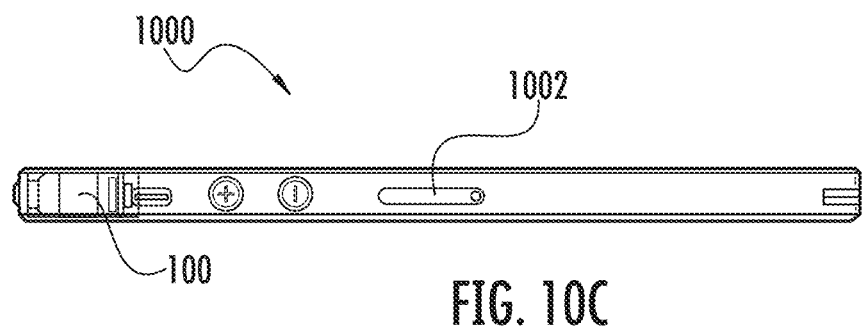

Having thus described the embodiments of the disclosure in general terms, reference now will be made to the accompanying drawings, which are not necessarily drawn to scale, and wherein:

FIGS. 1A and 1B illustrate exploded views of an integrated illumination-aimer imaging apparatus, in accordance with at least one example embodiment of the present disclosure;

FIGS. 2A-2D illustrate various views of combined components of an integrated illumination-aimer imaging apparatus, in accordance with at least one example embodiment of the present disclosure;

FIGS. 3A and 3B illustrate various views of an integrated illumination-aimer optics, in accordance with at least one example embodiment of the present disclosure;

FIG. 3C illustrates an example near-field illumination pattern, in accordance with at least one example embodiment of the present disclosure;

FIG. 3D illustrates an example far-field illumination pattern, in accordance with at least one example embodiment of the present disclosure;

FIG. 3E illustrates an example aimer pattern, in accordance with at least one example embodiment of the present disclosure;

FIGS. 4A and 4B illustrate various views of a near-field imaging lens, in accordance with at least one example embodiment of the present disclosure;

FIGS. 5A and 5B illustrate various views of a far-field imaging lens, in accordance with at least one example embodiment of the present disclosure;

FIGS. 6A-6D, illustrate various views of an apparatus chassis, in accordance with at least one example embodiment of the present disclosure;

FIG. 7 illustrates an example depiction of light leak protection in an integrated illumination-aimer imaging apparatus, in accordance with at least one example embodiment of the present disclosure;

FIG. 8 illustrates an example depiction of an example integrated illumination-aimer imaging apparatus with light reflection protection, in accordance with at least one example embodiment of the present disclosure;

FIG. 9A illustrates an example depiction of irreparable component alignment offset associated with prior art imaging apparatuses;

FIG. 9B illustrates an example depiction of improved irreparable component alignment offset, in accordance with at least one example embodiment of the present disclosure; and FIGS. 10A-10C illustrate various views of a mobile integrated illumination-aimer imaging apparatus, in accordance with at least one example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Conventional imaging apparatuses include various separated components for performing various functions. Such components include one or more illuminator sources for projecting an illumination pattern, each illuminator source coupled with separate optics (e.g., one or more lenses) for projecting the corresponding illumination pattern. Often, each separate component is fit within the apparatus utilizing one or more dedicated structural supports. Additionally, in conventional apparatuses, each separate component is fit with one or more adjustment components to enable realignment of the component. In this regard, in conventional apparatuses, as the number of components increases so too does the number of structural supports and/or adjustment components, for example often involving an increased wall thickness accumulation of the housing or chassis for the apparatus.

By including various separated components, such conventional apparatuses require sufficient space for each component, as well as corresponding structural components, adjustment components and/or alignment components. This required space not only forces an increase in apparatus size in some example conventional apparatuses, but increases material cost in manufacturing a larger unit. Furthermore, in conventional apparatuses, the structural supports for each separated component results in an irreparable offset between the various components based on the separation. For example, a conventional apparatus may include a dual-projection lenses for illumination and aimer optics, each component separate from the others. As the required spacing between the components increases, for example to allow for sufficient support structures for each component, the irreparable offset increases as well. The irreparable offset may cause any of a myriad of issues in accurately illuminating a field, capturing an image of the field, and/or accurately parsing the captured image.

Additionally or alternatively, each separate component may be manipulated independently. In this regard, the separated components may become further misaligned. To adjust each component, conventional apparatuses may include multiple adjustment components and/or each component may require adjustment for re-alignment with respect to the other components. Requiring adjustment components for each individual component further increases the unit size of the apparatus, further increases material costs, and increases the complexity of properly aligning the components of the apparatus. When components are particularly small, such adjustments may be made even more complex, if not impossible, due to the nature of facilitating small adjustments in component positioning and/or alignment.

Example embodiments of the present disclosure address the aforementioned problems utilizing an improved layout and various improved components. For example, embodiments herein include an integrated illumination-aimer optics. The integrated illumination-aimer optics may include a plurality of sub-assemblies integrated into a limited number of pieces and, in some example embodiments, a single piece. For example, the integrated illumination-aimer optics may include one or more illumination lens and/or one or more aimer projecting optics, for example one or more aimer pattern projection optics. The integrated illumination-aimer optics may be positioned together with one or more corresponding light generators (e.g., one or more illuminator sources and/or aimer sources), for example such that the lenses of the integrated illumination-aimer optics are properly aligned with their corresponding illuminator sources.

Due to the integrated nature of the integrated illumination-aimer optics, embodiments herein may provide structural support for the integrated illumination-aimer optics without separate structural elements for each sub-assembly thereof. By reducing the individual component separation between each optical component, embodiments of the present disclosure may be manufactured in a smaller form factor as compared to conventional apparatuses. Additionally or alternatively, by integrating several components into the integrated illumination-aimer optics, embodiments herein reduce the required structural support components and alignment components to further reduce the form factor of such embodiments as compared to conventional apparatuses.

The example integrated illumination-aimer optics minimizes the footprint overlap between components and sub-assemblies. In this regard, the decreased footprint enables further minimization of the required apparatus volume and front window area size to fit all components. In some embodiments, to further minimize apparatus size, the apparatus includes imaging lenses (e.g., a far-field imaging lens and/or near-field imaging lens) with a minimized front end to, in some examples, substantially increase the free front space between the imaging lenses. Further, in some examples, the increased free front space enables the apparatus to house the integrated illumination-aimer optics, for example, in the resulting free front space. In this regard, the area dedicated to the integrated illumination-aimer optics is overlapped with the image sensor areas and rear portion of the imaging lenses.

Additionally, the integrated nature of the integrated illumination-aimer optics may be adjusted and/or aligned without requiring separate alignment components. For example, in some embodiments, the alignment components of the integrated illumination-aimer imaging apparatus enable no-adjusting alignment between an aimer source, or other aimer light generation source, and aimer pattern projection optics through press-fitting the component. Additionally or alternatively, in some embodiments, the apparatus chassis is configured to enable slide-fitting of the far-field imaging lens to ensure alignment between the aimer pattern projection optics and far-field imager. The integrated illumination-aimer optics reduces, in some examples, the space associated with each integrated component, reducing the irreparable offset between such components (for example, between one or more illumination projection lenses and aimer projection optics).

In some embodiments, the integrated illumination-aimer optics includes specifically positioned sub-assemblies to minimize the irreparable offset introduced between components based on a prioritized alignment tolerance. For example, in some embodiments, an aimer optical sub-assembly is positioned close and/or adjacent to a far-field illumination projection lens, to utilize available space of the integrated illumination-aimer optics and to minimize the offset introduced due to the narrow field of view of the far-field imaging lens. In some such embodiments, the next alignment priority is minimizing the near-field illuminator source with closely matching the field of view for the near-field imaging lens, and the lowest alignment priority is the far-field illuminator source that projects an oversized illumination field relative to the field of view for the far-field imaging lens. In this regard, the cascaded level of alignment tolerances with over-sized matching field of view allows the near-field and far-field illuminator sources and aimer optics to be combined into the single-piece, integrated illumination-aimer optics for alignment together in the assembly by aligning the aimer optics and light generation (e.g., an aimer source).

By eliminating or substantially reducing the space between the separate optical components integrated into the integrated illumination-aimer optics, the integrated illumination-aimer optics fully utilizes a limited surface area. The single piece design of the integrated illumination-aimer optics produces further structural advantages. For example, by combining the multiple sub-assemblies into the integrated illumination-aimer optics, the integrated illumination-aimer optics may be manufactured as a single, injection molded part. In this regard, the integrated illumination-aimer optics reduces the component count of the apparatus, and may share mounting and/or alignment features within the apparatus.

Embodiments further provide specific advantages in positioning of the sub-assemblies and/or components therein. For example, in some embodiments, a multi-element near-field imaging lens and a far-field imaging lens have different focal lengths and lens assembly dimensions. Some such embodiments of the present disclosure include corresponding split-multilevel sensor boards arranged at different mounting planes. In this regard, the mounting planes for the near-field sensor and the far-field sensor are positioned to allow the lens front of each corresponding lens to be closely aligned with the front edge of the embodiment assembly (e.g., closer to a projection window). Additionally or alternatively, embodiments of the present disclosure position the integrated illumination-aimer optics within the apparatus to minimize unwanted light interference due to reflection (for example protective window reflection) and light leakage (for example through gaps between the lenses and the apparatus chassis).

Example Apparatus Assemblies

Figure 2A:
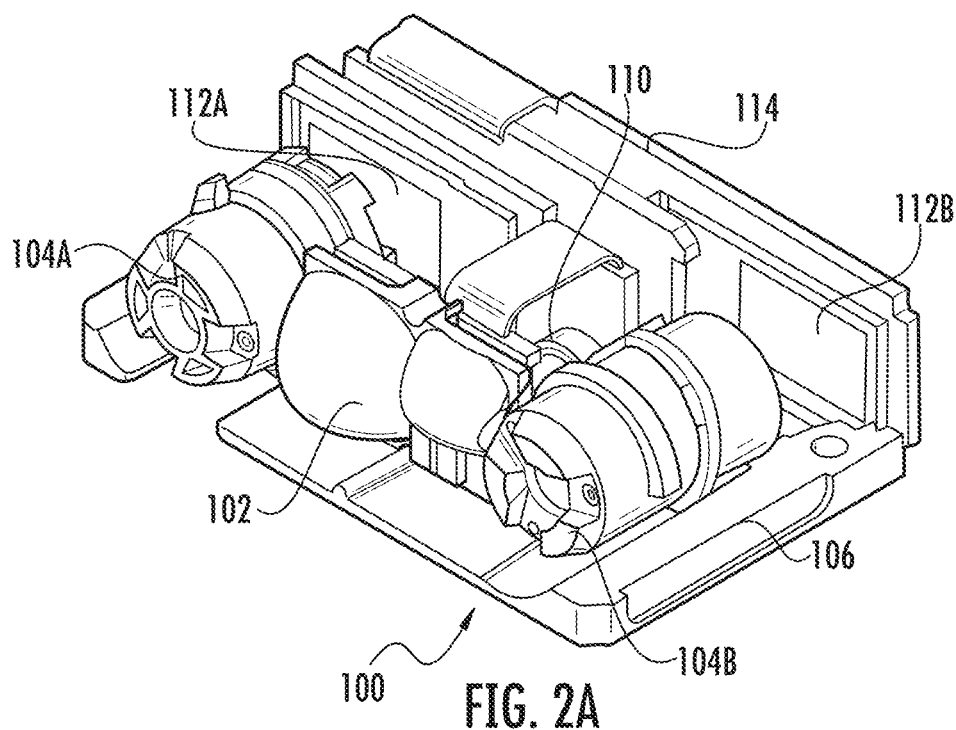

FIGS. 1A and 1B illustrate exploded views depicting components of an example integrated illumination-aimer imaging apparatus 100 in accordance with example embodiments of the present disclosure. Specifically, FIG. 1A illustrates a front-angled exploded view of the integrated illumination-aimer imaging apparatus 100, and FIG. 2A illustrates a back-angled exploded view of the integrated illumination-aimer imaging apparatus 100. The integrated illumination-aimer imaging apparatus 100 includes an integrated illumination-aimer optics 102, a near-field imaging lens 104A, a far-field imaging lens 104B, an apparatus chassis 106, a far-field illuminator source 108A, a near-field illuminator source 108B, an aimer source 110, a near-field imaging sensor 112A, a far-field imaging sensor 112B, and a circuit board 114. The apparatus chassis 106 may be specifically designed to house, position, and/or otherwise align the various components as described herein.

In some embodiments, the circuit board 114 embodies a printed circuit board configured for mounting a plurality of components. For example, in at least one example embodiment, the circuit board 114 embodies a rigid flex circuit board (e.g., a rigid flex PCB) to minimize connector space and thus reduce the overall profile associated with the components thereof. In at least some example embodiments, the circuit board 114 is configured for mounting a plurality of imaging sensors, such as the near-field imaging sensor 112A and the far-field imaging sensor 112B, and one or more light generation components, such as the far-field illuminator source 108A, near-field illuminator source 108B, and aimer source 110. As illustrated, the circuit board 114 is configured to secure each of the components at a particular position within a multi-layered structure. Specifically, as illustrated, the circuit board 114 comprises a first, back layer for securing the position of the far-field imaging sensor 112B, another layer for securing the position of the near-field imaging sensor 112A and also for securing the position of the aimer source 110, and a front layer for securing the position of the far-field illuminator source 108A and near-field illuminator source 108B. In this regard, utilizing the various layers, the circuit board 114 is designed to enable specific positions of each component within the apparatus chassis 106. For example, in some embodiments, the circuit board 114 superficially positions each component at a particular distance from the front of the integrated illumination-aimer imaging apparatus 100 to enable subsequent components to fit in proper alignment with each component positioned via the circuit board 114. In some embodiments, the various components are fixedly attached to the printed circuit board, for example the circuit board 114, to secure an electrical connection between the various components and the printed circuit board through one or more known means (e.g., soldered connections).

Additionally or alternatively, as illustrated, the integrated illumination-aimer imaging apparatus 100 includes a near-field imaging lens 104A. An example embodiment of near-field imaging lens 104A is discussed below with respect to FIGS. 4A and 4B. The near-field imaging lens 104A embodies an imaging lens configured to allow light from a specific near-field field of view to pass through to a corresponding imaging sensor, thus enabling capture of the near-field field of view by the corresponding sensor. For example as illustrated, the near-field imaging lens 104A is to be aligned with the near-field imaging sensor 112A, such that the near-field imaging sensor 112A receives light via the near-field imaging lens 104A. In this regard, the near-field imaging lens 104A may be specifically positioned within the apparatus chassis 106 via one or more structural support components as described herein.

Similarly, the integrated illumination-aimer imaging apparatus 100 includes a far-field imaging lens 104B. An example embodiment of far-field imaging lens 104B is discussed below with respect to FIGS. 5A and 5B. The far-field imaging lens 104B embodies an imaging lens configured to allow light from a specific far-field field of view to pass through to a corresponding imaging sensor, thus enabling capture of the far-field field of view by the corresponding sensor. For example as illustrated, the far-field imaging lens 104B is to be aligned with the far-field imaging sensor 112B, such that the far-field imaging sensor 112B receives light via the far-field imaging lens 104B. In this regard, the far-field imaging lens 104B may be specifically positioned within the apparatus chassis 106 via one or more structural support components as described herein.

In some embodiments, the near-field imaging lens 104A and far-field imaging lens 104B are each constructed with different focal lengths, field of views, and/or the like. In this regard, the near-field imaging lens 104A and far-field imaging lens 104B may be utilized to capture different images based on the focal lengths, field of views, or other optical configurations of the lenses. In other embodiments, the near-field imaging lens 104A and far-field imaging lens are each associated with a shared focal length and/or shared field of view. It should be appreciated that in other embodiments, one or more additional lenses may be included, for example having a third focal length and/or third field of view, or a shared focal length and/or field of view.

Additionally, as illustrated, the integrated illumination-aimer imaging apparatus 100 includes an integrated illumination-aimer optics 102. An example embodiment of the integrated illumination-aimer optics 102 is described below with respect to FIGS. 3A and 3B. The integrated illumination-aimer optics 102 comprises a number of sub-assemblies for projecting corresponding illumination patterns and an aimer pattern based on light produced by one or more associated light generation components. In this regard, the integrated illumination-aimer optics 102 may be configured for specific positioning within the apparatus chassis 106, for example to enable alignment with one or more corresponding light generation components (e.g., illuminator sources and/or aimer source). In some embodiments, the integrated illumination-aimer optics comprise a single piece, for example an injection molded component such that no, or substantially no, excess space remains between the various sub-assemblies therein. It should be appreciated that the integrated illumination-aimer optics 102 may be formed of any of a number of known lens materials, for example injection-molded plastic.

The far-field illuminator source 108A may be embodied by any of a number of light generation components. In some embodiments, the far-field illuminator source 108A is embodied by one or more light emitting diodes ("LED"), for example where the far-field illuminator source 108A is embodied by a first light emitting diode. The near-field illuminator source 108B similarly may be embodied by any of a number of light generation components. In some embodiments, the near-field illuminator source 108B is embodied by one or more LEDs, for example where the near-field illuminator source 108B is embodied by a second LED. In some embodiments, the far-field illuminator source 108A and near-field illuminator source 108B produce light at different intensity levels and/or patterns. In other embodiments, the far-field illuminator source 108A and near-field illuminator source 108B produce light at the same intensity level.

The aimer source 110 may be embodied by any of a number of light generation components. In some embodiments, the aimer source 110 is embodied by any of a number of high-intensity LEDs that produce a high-intensity coherent and/or monochromatic light source. The aimer source 110 is aligned for projecting light through a particular component of the apparatus chassis 106, for example for projection via a sub-assembly of the integrated illumination-aimer optics 102. It should be appreciated that the aimer source 110 may be embodied by any of a number of known LEDs, laser diodes or other components, and/or devices. In at least one example embodiment, the aimer source 110 comprises a laser diode configured to produce a narrow laser beam of light with high intensity and concentration, such that the produced aimer laser beam may be utilized to produce a high-visibility aimer pattern, even at far distances (e.g., when projected to a far-field).

FIG. 2A illustrates a front-angled view of the integrated illumination-aimer imaging apparatus 100 with all components positioned within the apparatus chassis 106. Specifically, the illustrated view does not include the top and/or side portions of the apparatus chassis 106 to enable visibility of the overlapping sub-assemblies within the apparatus chassis 106. It should be appreciated that the removal of the top and sides of apparatus chassis 106 are for illustrative purposes only.

As illustrated in FIG. 2A, the various sub-assemblies and components of integrated illumination-aimer imaging apparatus 100 are depicted in specific positions and alignments facilitated by the apparatus chassis 106. For example, the circuit board 114 is specifically positioned with respect to the apparatus chassis 106. In this regard, the various components of the circuit board 114 are configured for positioning and alignment at predefined positions within the apparatus chassis 106. The near-field imaging sensor 112A and far-field imaging sensor 112B are split apart (e.g., located at opposite ends of the length of the apparatus chassis 106), reducing, in some examples, the likelihood of unwanted light pollution resulting from sensors being too closely related. Additionally, the near-field imaging sensor 112A and far-field imaging sensor 112B are positioned at different distances from the front of the apparatus chassis 106. In this regard, the sensors are positioned to enable the apparatus chassis 106 to fit corresponding imaging lenses, and align the lenses towards the front of the apparatus chassis 106 rather than having the Further, the near-field imaging lens 104A is specifically positioned in front of, and aligned with, the near-field imaging sensor 112A. Similarly, the far-field imaging lens 104B is specifically positioned in front of, and aligned with, the far-field imaging sensor 112B. The apparatus chassis 106 is configured to provide support structures for positioning the near-field imaging lens 104A and far-field imaging lens 104B in their corresponding specific and aligned positions.

Specifically, as illustrated, the near-field imaging lens 104A and far-field imaging lens 104B are positioned for front-end alignment within the apparatus chassis 106 despite their size difference. Similarly, the near-field imaging lens 104A is positioned at a distance from the near-field imaging sensor 112A different from the far-field imaging lens 104B distance from the far-field imaging sensor 112B. In this regard, the lenses 104A and 104B are positioned specifically to maintain the front alignment without affecting the effectiveness of sensors 112A and 112B.

The near-field imaging sensor 112A is embodied by an imaging sensor for capturing and/or capturing and processing light received through the near-field imaging lens 104A. Similarly, the far-field imaging sensor 112B is embodied by a second imaging sensor for capturing and/or capturing and processing light received through the far-field imaging lens 104B. In some embodiments, the near-field imaging sensor 112A is configured as a different pixel resolution as compared to the far-field imaging sensor 112B. It should be appreciated that the near-field imaging sensor 112A and/or far-field imaging sensor 112B may be embodied by any of a number of known imaging sensors. A non-limiting example of a near-field imaging sensor 112A includes the AR0234 global shutter monochrome sensor (1920×1200 resolution, 3 um pixel), and a non-limiting example of a far-field imaging sensor 112B includes the AR0144 global shutter monochrome sensor (1280×800 resolution, 3 um pixel), each manufactured by ON Semiconductor® headquartered in Phoenix, Arizona.

Further, the integrated illumination-aimer imaging apparatus 100 includes integrated illumination-aimer optics 102. The integrated illumination-aimer optics 102 is positioned, for example using support structures of the apparatus chassis 106 as described below, between the near-field imaging lens 104A and the far-field imaging lens 104B. Additionally, the integrated illumination-aimer optics 102 is aligned, for example using support structures of the apparatus chassis 106 as described below, in with the near-field illuminator source 108B (not depicted), far-field illuminator source 108A (not depicted), and aimer source 110. In this regard, the near-field illuminator source 108B produces light that, through a sub-assembly of the integrated illumination-aimer optics 102, produces a particular near-field light pattern onto a particular field. Similarly, the far-field illuminator source 108A produces light that, through a second sub-assembly of the integrated illumination-aimer optics 102, produces a second particular far-field light pattern onto the field. Additionally, the aimer source 110 produces light that, through a third-subassembly of the integrated illumination-aimer optics 102, produces an aimer pattern that is projected onto the field.

As illustrated, the integrated illumination-aimer optics 102 is positioned between the near-field imaging lens 104A and the far-field imaging lens 104B. Specifically, the integrated illumination-aimer optics 102 fits between the reduced lens fronts of the two lenses 104A and 104B. Such positioning enables a decrease in the overall required volume for the integrated illumination-aimer imaging apparatus 100. Additionally, as illustrated, the various sub-assemblies and components are positioned to overlap, such that the volume of the integrated illumination-aimer imaging apparatus 100 is maximized (e.g., little or no excess volume for various components or excess support and/or alignment structures).

In other embodiments, it should be appreciated that any number of lenses, illuminator sources, and/or corresponding sensors may be provided. For example, in some embodiments, an embodiment apparatus includes at least one additional lens each with a corresponding additional illuminator source and additional imaging sensor. In this regard, in such embodiments, it should be appreciated that the integrated illumination-aimer optics may be expanded to include additional sub-assemblies embodying illumination optics corresponding to each additional illuminator source. Similarly, the arrangement of such sub-assemblies may be altered as the number of sub-assemblies increases (e.g., to match the shape arrangement of the corresponding illuminator sources).

It should be appreciated that, in some embodiments, the arrangement of illuminator sources and corresponding imaging lenses may be limited based on one or more volumetric restriction requirements. For example, in some conventional mobile apparatus chasses, a height restriction of 6.8 mm is imposed to fit the mobile apparatus chassis. As such, linear arrangements may be required to ensure that a plurality of components fits within the mobile apparatus chassis. Further, the components may be arranged to maximize the distance between each illuminator source and corresponding imaging lens. As such, integrated illumination-aimer optics may include a plurality of sub-assemblies corresponding to each illuminator source arranged in a particular manner to maximize such distances within a corresponding apparatus. For example, in an apparatus with three illuminator sources having three projection pattern optics (S1, S2, S3) and three corresponding imaging lenses (L1, L2, L3), the components may be arranged linearly as L1-53-52-S1-L3-L2, with S1-S2-S3 arranged as subassemblies of an integrated illumination-aimer optical component. In this manner, the linear arrangement may enable the components to fit within a low-height apparatus chassis, while the arrangement between such components minimizes the likelihood of errors due to reflected light from each corresponding illuminator source. It should be appreciated that similar arrangements may be designed as the number of components increases, and alternative arrangements may be designed for the same number of components.

In this regard, in at least some embodiments, embodiments are arranged including the integrated illumination-aimer optics such that each illumination projection lens of the integrated illumination-aimer optics is positioned at a set threshold distance from its corresponding imaging lens (e.g., a set lateral distance). In some embodiments, such arrangements are achieved by positioning the integrated illuminator-aimer optics between one or more imaging lenses, for example as described above, such that each illumination projection lens of an integrated illumination-aimer optics is at the same threshold distance from its corresponding imaging lens regardless of the direction for the distance between the illumination projection lens and corresponding imaging lens (e.g., one or more illumination projection lens may be separated by the threshold distance to corresponding imaging lenses to the right of the illumination projection lens, and one or more illumination projection lens may be separated by the threshold distance to corresponding imaging lenses to the left of the illumination projection lens). In other embodiments, such arrangements are achieved by positioning the integrated illuminator-aimer optics in an alternative position with respect to one or more imaging lenses. For example, in some embodiments, the integrated illuminator-aimer optics is positioned such that the imaging lenses are arranged together where each imaging lens is the same threshold distance from a corresponding illumination projection lens of the integrated illumination-aimer optics in a single direction. In one non-limiting example for three illumination projection optics (S1, S2, S3) of an integrated illumination-aimer optics and three imaging lenses (L1, L2, L3), where each lens is associated with the corresponding, similarly numbered illumination projection optics (e.g., S1 and L1 are associated for purposes of projecting and processing, S2 and L2, and so on), example apparatuses may arrange the components in the arrangement of L1-L2-L3-S1-S2-S3 or similarly S1-S2-S3-L1-L2-L3. For example and explanatory purposes, if each component is associated with a unit size of 1 unit, then the threshold distance for each component is 3 units (e.g., S1 and L1 are separated by 3 units, S2 and L2 by 3 units, and S3 and L3 by 3 units). It should be appreciated that other embodiments may similarly include each imaging lens and corresponding illumination projection optics sub-assembly of an integrated illumination-aimer optics are separated (e.g., according to a vertical and/or horizontal position) by the same threshold distance. In this regard, embodiments may include any number of additional imaging lens corresponding to any number of additional image sensors, and any number of additional illuminator source corresponding to any number of additional illumination projection lens of the integrated illumination-aimer optics.

Figure 2B:
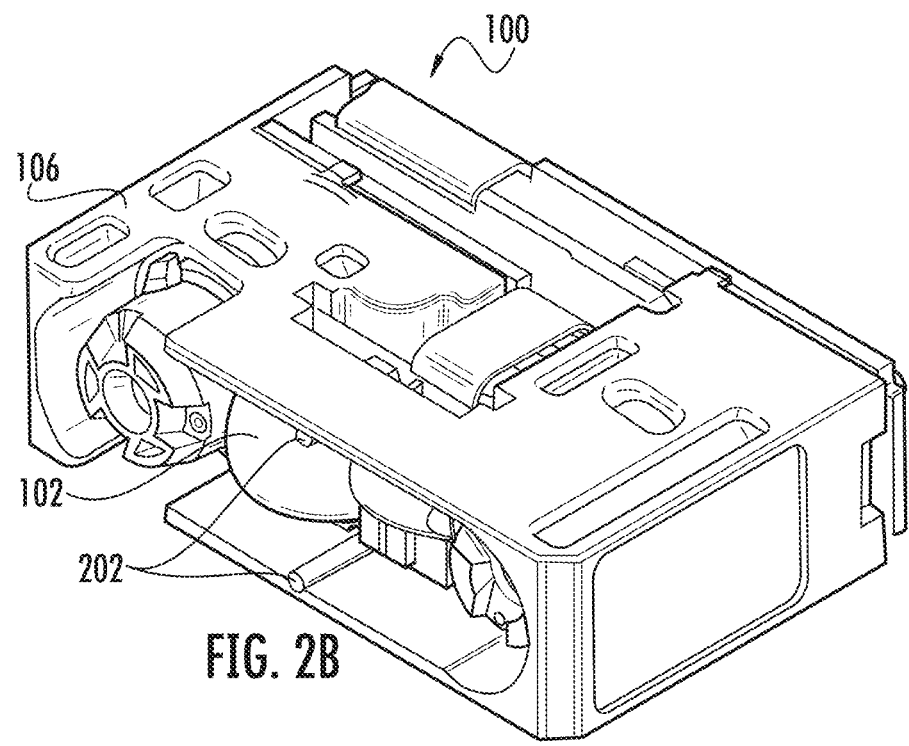

As illustrated, the sub-assemblies and/or components of integrated illumination-aimer imaging apparatus 100 are positioned and/or aligned utilizing various structural supports. Example of such structural supports are provided with respect to the various fittings illustrated and described below with respect to FIGS. 2B-2D. For example, FIG. 2B illustrates a front-angle view of the integrated illumination-aimer imaging apparatus 100 in accordance with example embodiments of the present disclosure. Specifically, the view illustrated in FIG. 2B depicts the apparatus chassis 106 with top and sides included in the rendering.

As illustrated in FIG. 2B, the apparatus chassis 106 comprises integrated illumination-aimer optics fittings 202 integrated into the design of the apparatus chassis 106. As illustrated, the illumination-aimer optics fittings 202 define a particular illumination-aimer optics cavity for positioning and aligning the integrated illumination-aimer optics 102 within the apparatus chassis 106. The integrated illumination-aimer optics fittings 202 are specifically designed to enable press-fitting of the integrated illumination-aimer optics 102 into the apparatus chassis 106. By press-fitting the integrated illumination-aimer optics 102 into the apparatus chassis 106, the integrated illumination-aimer optics 102 is positioned, aligned, and secured in place by the integrated illumination-aimer optics fittings 202. In this regard, the integrated illumination-aimer optics fittings 202 may be specifically designed to match cutout portions of the integrated illumination-aimer optics 102, for example to enable positioning into place via the integrated illumination-aimer optics fittings 202. In this regard, utilizing the integrated illumination-aimer optics fittings 202, the integrated illumination-aimer optics 102 may be positioned and aligned within the apparatus chassis 106 without additional structural components and/or alignment components.

Figure 2C:
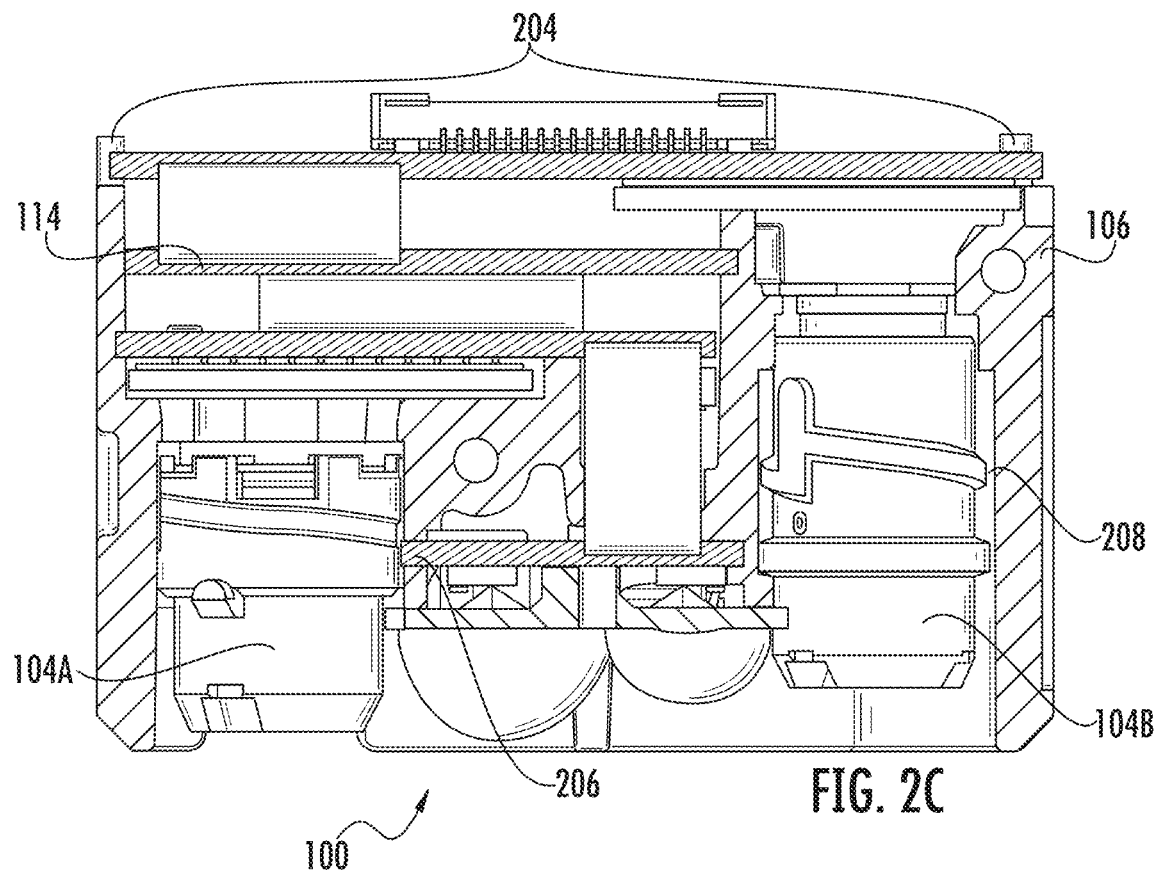

FIG. 2C illustrates a top-down cross-sectional view of the integrated illumination-aimer imaging apparatus 100 in accordance with example embodiments of the present disclosure. Specifically, the view illustrated in FIG. 2C depicts apparatus chassis 106 with various fittings for securing and/or aligning the circuit board 114, near-field imaging lens 104A, and/or far-field imaging lens 104B.

As illustrated in FIG. 2C the apparatus chassis 106 comprises sensor board fittings 204. As illustrated, the sensor board fittings 204 embody protrusions on the back-end of the apparatus chassis 106. Further, the apparatus chassis 106 comprises a plurality sensor board cavities that each receive a portion of the circuit board 114. The circuit board 114 is designed to receive the sensor board fittings 204 (for example, via cutouts positioned on the circuit board 114) to position, align, and secure the circuit board 114 into place. For example, as illustrated, the apparatus chassis 106 comprises four sensor board fittings 204, one positioned near each corner of the back of the apparatus chassis 106. During manufacturing and/or assembly, the user and/or an assembly system may press-fit and/or otherwise secure the circuit board 114 to the sensor board fittings 204 by engaging the circuit board 114 with the sensor board fittings 204. It should be appreciated that, in other embodiments, the apparatus chassis 106 may include any number of sensor board fittings 204. Additionally or alternatively, it should be appreciated that, in other embodiments, the apparatus chassis 106 may be additionally secured to the circuit board 114 utilizing one or more other securing means (e.g., one or more adhesives, fasteners, or other known securing means the like).

Further, as illustrated in FIG. 2C, the apparatus chassis 106 comprises near-field lens fitting 206. The near-field lens fitting 206 is configured to define a near-field imaging lens cavity that receives the near-field imaging lens 104A, to position and align the near-field imaging lens 104A within the apparatus chassis 106. In this regard, as illustrated for example, the near-field lens fitting 206 is embodied as a particular cutout within the apparatus 200 configured to receive a protrusion of the near-field imaging lens 104A. In this regard, the near-field imaging lens 104A may be positioned and/or aligned within the apparatus chassis 106 through rotation guided by the protrusion of the near-field imaging lens 104A engaged with the near-field lens fitting 206. Additionally or alternatively, in some embodiments, the near-field imaging lens 104A is positioned, aligned, and/or secured via the near-field lens fitting 206 utilizing a press-fit, or by sliding the near-field imaging lens 104A into position associated with the near-field lens fitting 206. FIG. 2C, as illustrated, further comprises far-field lens fitting 208. The far-field lens fitting 208 is configured to define a far-field imaging lens cavity that receives the far-field imaging lens 104B, to position and align the far-field imaging lens 104B within the apparatus chassis 106. In this regard, as illustrated for example, the far-field lens fitting 208 is similarly embodied as a particular cutout within the apparatus 200 configured to receive a protrusion of the far-field imaging lens 104B. The engagement between the far-field lens fitting 208 and far-field imaging lens 104B may interact similarly, if not identically, to the engagement described above between the near-field lens fitting 206 and near-field imaging lens 104A.

Figure 2D:
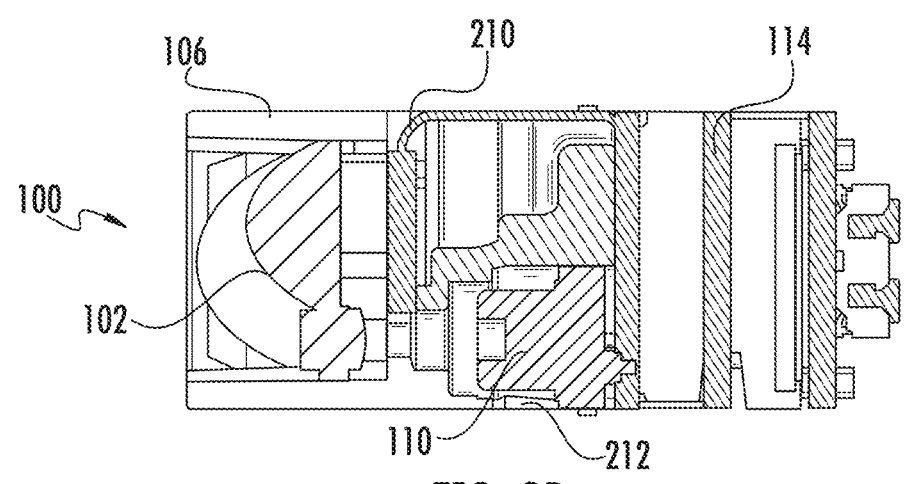

FIG. 2D illustrates a lateral cross-sectional view of the integrated illumination-aimer imaging apparatus 100 in accordance with example embodiments of the present disclosure. Specifically, the view illustrated in FIG. 2D depicts apparatus chassis 106 with various fittings for securing and/or aligning one or more layers of the circuit board 114 and/or fixedly attached components thereof. For example, in an example embodiment as depicted, the apparatus chassis 106 includes fittings configured to receive a plurality of rigid boards (e.g., various layers) of the circuit board 114 to secure these boards. Such rigid boards include an aimer source layer including at least the aimer source 110, and/or an illuminator source layer including one or more illuminator sources. In this regard, upon positioning and/or aligning the illuminator source layer of the circuit board 114, one or more illuminator sources, for example the near-field illuminator source 108B (not depicted) and/or the far-field illuminator source 108A (not depicted), are similarly positioned, secured, and/or aligned.

As illustrated in FIG. 2D the apparatus chassis 106 comprises aimer source chassis fitting 212. The aimer source chassis fitting 212 comprises a portion of the apparatus chassis 106 configured to receive the aimer source 110. The aimer source chassis fitting 212 encloses a defined area (i.e., defining an aimer source cavity within the apparatus chassis 106) to receive a particular size aimer source 110, and position and/or align the aimer source 110 such that light projected by the aimer source 110 is projected into one or more dedicated aimer optical components of the integrated illumination-aimer optics 102. In this regard, for example as illustrated, the aimer source chassis fitting 212 engages a portion of the aimer source 110 to secure the aimer source 110 facing towards the front of the apparatus chassis 106.

Further, as illustrated in FIG. 2D, the apparatus chassis 106 comprises illuminator board chassis fitting 210. The illuminator board chassis fitting 210 is designed to receive a portion of the circuit board 114 for securing the illuminator board (e.g., the board including one or more illuminator sources associated with one or more corresponding illumination projection optics of the integrated illumination-aimer optics 102) of the circuit board 114. Specifically, the illuminator board chassis fitting 210 receives a portion of the illuminator board of the circuit board 114, or an associated flexible positioning element. In this regard, the illuminator board chassis fitting 210 is designed to engage the portion of the circuit board 114 such that the illumination board is positioned, secured, and aligned with the integrated illumination-aimer optics 102.

It should be appreciated that the particular chassis fittings depicted and described above with respect to FIGS. 2B-2D provide support and/or alignment for the various sub-assemblies of the integrated illumination-aimer imaging apparatus 100. The particular overlapping of the various sub-assemblies is facilitated, at least in part, due to the fittings as illustrated and described. In this regard, in some such embodiments, the various fittings described enable a minimized form factor associated with the integrated illumination-aimer imaging apparatus 100.

By overlapping and integrating positions of the various components, the integrated illumination-aimer imaging apparatus 100 obtains a significantly smaller unit size than prior art imaging apparatuses. For example, in some embodiments, the integrated illumination-aimer imaging apparatus 100 includes a width (e.g., from the apparatus front for capturing and/or projecting various pattern projections) of 16.2 millimeters, a length (e.g., from one side of the apparatus chassis near the far-field imaging lens to the other side of the apparatus chassis near the near-field imaging lens) of 23.5 mm, and a height (e.g., from the bottom of the apparatus near the aimer to the top of the apparatus) of 6.8 mm. In this regard, the integrated illumination-aimer imaging apparatus 100 provides for more than 50% front window area reduction as compared to conventional dual-projector imaging apparatuses. Additionally, the integrated illumination-aimer imaging apparatus 100 provides for more than 75% volume reduction as compared to conventional dual-projector imaging apparatuses. In this regard, the volume-saving nature of the integrated illumination-aimer imaging apparatus 100 enables integration with smaller apparatuses (e.g., mobile apparatuses as described herein with respect to FIGS. 10A-10C) in addition to cost savings. In some embodiments, one or more dimensions are maximal based on one or more dimensional requirements for the embodiment apparatus. For example, in some mobile embodiments, the height of the apparatus may be no more than 6.8 mm for including in one or more conventional housings (e.g., a mobile device housing).

Example Components of Example Embodiments

Having described an example embodiment of the present disclosure, and corresponding integration between components thereof, further description is provided with respect to specifics of particular components of embodiments herein. It should be appreciated that, in some embodiments, the components may include additional and/or alternative features without deviating from the scope and spirit of the disclosure herein. In this regard, the specific example component illustrations are not to limit the scope and spirit of the disclosure.

FIGS. 3A and 3B illustrate isolated views of the integrated illumination-aimer optics 102 in accordance with an example embodiment of the present disclosure. Specifically, FIG. 3A illustrates a front-angle view of the integrated illumination-aimer optics 102, and sub-assemblies thereof. FIG. 3B illustrates a back-angle view of the integrated illumination-aimer optics 102, and sub-assemblies thereof.

The illustrated integrated illumination-aimer optics 102 comprises a single optical component with multiple sub-assemblies therein. In this regard, the integrated illumination-aimer optics 102 may be an injection molded component created from injection-molded plastic. By injection molding the integrated illumination-aimer optics 102, in some examples, the component may be made consistently in a compact form factor with minimized space between the various sub-assemblies therein. Additionally, in this regard and in some examples, the component may be manufactured at a lower cost than the plurality of sub-assemblies independently Further as illustrated, the integrated illumination-aimer optics 102 comprises a far-field illumination projection lens 304. In some embodiments, the far-field illumination projection lens 304 is configured to receive light projected by a corresponding far-field illuminator source, for example embodied by the far-field illuminator source 108A. Specifically, the far-field illumination projection lens 304 is configured to receive light projected by the far-field illuminator source and produce a corresponding far-field projection pattern, for example the far-field projection pattern 360 illustrated with respect to FIG. 3D. It should be appreciated that, in other embodiments, the far-field illumination projection lens 304 may be designed to produce an alternative far-field projection pattern based on a desired horizontal spread, vertical spread, or any number of alternative desired projection parameters (e.g., illumination distribution, pattern shape, and/or the like). In some such embodiments, the far-field illumination projection lens 304 is configured to house the corresponding far-field illuminator source when properly positioned and/or aligned within an apparatus chassis.

Further, as illustrated, the integrated illumination-aimer optics 102 further comprises a near-field illumination projection lens 302. In some embodiments, the near-field illumination projection lens 302 is configured to receive light projected by a corresponding near-field illuminator source, for example embodied by the near-field illuminator source 108B. Specifically, the near-field illumination projection lens 302 is configured to receive light projected by the near-field illuminator source and produce a corresponding near-field projection pattern, for example the near-field projection pattern 350 illustrated with respect to FIG. 3C. In this regard, the near-field projection pattern 350 may be associated with a near-field illumination pattern projection size having a particular horizontal and vertical illumination spread, and the far-field projection pattern 360 may be associated with a far-field illumination pattern projection size having a second horizontal and vertical illumination spread. In this regard, the near-field illumination pattern projection size may be larger than the far-field illumination pattern projection size in at least one direction (e.g., an x-direction, a y-direction, or both). It should similarly be appreciated that, in other embodiments, the near-field illumination projection lens 302 may be designed to produce an alternative near-field projection pattern based on a desired horizontal spread, vertical spread, or any number of alternative desired projection parameters. In some such embodiments, the near-field illumination projection lens 302 is configured to house the corresponding near-field illuminator source when properly positioned and/or aligned within an apparatus chassis.

Further, as illustrated, the integrated illumination-aimer optics 102 further comprises an aimer collimating lens 308. In some embodiments, the aimer collimating lens 308 is configured to receive light projected by a corresponding aimer source, for example embodied by the aimer source 110. Specifically, the aimer collimating lens 308 is configured to receive the light projected by the aimer source and collimate the incoming light for projection. For example, in this regard, the aimer collimating lens 308 may receive light projected from the aimer source (e.g., high intensity light or a laser beam), and collimate the received light into a parallel light beam for projection. As illustrated, the integrated illumination-aimer optics 102 further comprises aimer pattern projection optics 306. In some embodiments, the integrated illumination-aimer optics 102 comprises the aimer pattern projection optics 306 in front of the aimer collimating lens 308. In this regard, the aimer pattern projection optics 306 may receive the collimated light produced via the aimer collimating lens 308, and subsequently produce a corresponding aimer projection pattern, for example the aimer pattern 370 illustrated with respect to FIG. 3E. It should be appreciated that, in other embodiments, the aimer pattern projection optics 306 may be designed to produce an alternative aimer pattern.

It should be appreciated that the integrated illumination-aimer optics 102 may be designed using any number of sizes and/or sub-assemblies of various sizes as desired. In an example embodiment, the integrated illumination-aimer optics 102 is designed with a length (e.g., from the side of the near-field illumination projection lens 302 to the other side of the far-field illumination projection lens 304) of 9.87-9.89 millimeters, a width (e.g., from the bottom to the top of the integrated illumination-aimer optics 102) of 5.49-5.51 millimeters, and a total depth (e.g., from the front of the largest illumination projection lens to the back of the component) of 4.33-4.37 millimeters. In this regard, the larger far-field illumination projection lens 304 is designed as a non-rotational symmetric polynomial with a distance of 2.79-2.81 millimeters to the most-forward point, and the smaller near-field illumination projection lens 302 is designed as a second non-rotational symmetric polynomial with a distance of 2.24-2.26 to the most forward-point. It should be appreciated that other embodiments may include sub-assemblies designed with other measurements to produce intended results (e.g., desired illumination pattern(s)).

The integrated illumination-aimer optics 102 provides various advantages over conventional implementations utilizing various separate components. For example, the integrated illumination-aimer optics 102 may be injected molded and/or otherwise created as a single piece, lowering component count and cost associated with manufacturing such components. Further, by integrating the various imaging lenses and aimer optics into a single piece, the integrated illumination-aimer optics 102 may be positioned, secured, and/or aligned without requiring individual adjustments of each small component. Additionally, the integrated illumination-aimer optics 102 includes the near-field illumination projection lens 302 and far-field illumination projection lens 304 sufficiently adjacent to one another such that no, or substantially no, excess space exists between the two lenses. Furthermore, the aimer pattern projection optics 306 and corresponding aimer collimating lens 308 are arranged substantially close to the illumination projection lenses 302 and 304. In this regard, the integrated illumination-aimer optics 102 reduces the form factor typically associated with these components, decreasing the overall required volume for fitting the integrated illumination-aimer optics 102 within an apparatus and allowing for utilization of a smaller apparatus chassis. Further, by reducing the distance between the aimer pattern projection optics 306 and the near-field illumination projection lens 302, and similarly reducing the distance between the aimer pattern projection optics 306 and the far-field illumination projection lens 304, the integrated illumination-aimer optics 102 reduces inherent, irreparable offset between the resulting projections from such components, for example described below with respect to FIGS. 9A and 9B. For example, in some embodiments, the aimer pattern projection optics and corresponding aimer collimating lens 308 are positioned under the near-field illumination projection lens 302 to greatly reduce the irreparable offset in an associated near-field, since the closeness of the near-field may have an increased likelihood of the irreparable offset between the components having a noticeable effect on the projected patterns (e.g., causing an error) as compared to projections into a far-field. Reducing such offset between projections reduces the likelihood of misalignment errors.

FIGS. 4A and 4B illustrate isolated views of the near-field imaging lens 104A in accordance with an example embodiment of the present disclosure. Specifically, FIG. 4A illustrates a front-angle view of the near-field imaging lens 104A. FIG. 4B illustrates a side cross-sectional view of the near-field imaging lens 104A to depict particular sub-assemblies thereof.

As illustrated, the near-field imaging lens 104A is embodied by a 3-piece optical lens, for example a 3-plastic optical lens 402. Specifically, the 3-plastic optical lens 402 embodies a cylindrical shape, forming the cylindrical-shaped near-field imaging lens 104A from the various sub-lenses thereof and associated casing. The near-field imaging lens 104A comprises a front end 404 and a back end 406, the front end 404 located opposite the back end 406. The 3-plastic optical lens 402 enables imaging of light that is received through the front end 404, and that reaches an imaging component (e.g., a near-field imaging sensor) via the back end 406. The front end 404 comprises a radius that is smaller than the radius of the back end 406. The smaller front end 404 enables additional volume to be made available when positioned within an apparatus chassis, for example to enable positioning within the apparatus of an integrated illumination-aimer optics between the near-field imaging lens 104A and a corresponding far-field imaging lens, such as far-field imaging lens 104B. Additionally, the reduced front radius of the near-field imaging lens 104A assists in preventing undesired light, such as light due to reflection from a protective window and/or one or more other components as described below with respect to FIG. 8, from entering the lens and/or reaching a corresponding imaging sensor.

It should be appreciated that, in other embodiments, the near-field imaging lens 104A is embodied by another optical lens based on the requirements of the apparatus and/or a desired cost. For example, in some embodiments, a 1-glass 2-plastic optical lens is utilized to improve thermal stability as a tradeoff to lower optical performance and increased cost. In this regard, the specific implementation of the near-field imaging lens 104A may be dependent on various requirements and/or desired performance metrics that trade-off between various parameters (e.g., optical performance, thermal stability, cost, and the like).

Similarly, FIGS. 5A and 5B illustrate isolated views of the far-field imaging lens 104B in accordance with an example embodiment of the present disclosure. Specifically, FIG. 5A illustrates a front-angle view of the far-field imaging lens 104B. FIG. 5B illustrates a side cross-sectional view of the far-field imaging lens 104B to depict particular sub-assemblies thereof.

As illustrated, the far-field imaging lens 104B is embodied by a 3-glass optical lens 502. Specifically, the 3-glass optical lens 502 embodies a cylindrical shape, forming a cylindrical-shaped far-field imaging lens 104B from the various sub-lenses thereof and associated casing. The far-field imaging lens 104B comprises a front end 504 and a back end 506. The 3-glass optical lens 502 enables imaging of light that is received through the front end 504, and that reaches an imaging component (e.g., a far-field imaging sensor) via the back end 506. The smaller front end 504 comprises a radius that is smaller than the radius of the back end 506. The smaller front end 504 enables additional volume to be made available when positioned within an apparatus chassis, for example to enable positioning within the apparatus of integrated illumination-aimer optics between the far-field imaging lens 104B. Additionally, the reduced front radius of the far-field imaging lens 104B assists, in some examples, in preventing undesired light, such as light due to reflection from a protective window and/or one or more other components as described below with respect to FIG. 8, from entering the lens and/or reaching a corresponding imaging sensor. It should be appreciated that, in some embodiments, the radius ratio between the front end 504 and the back end 506 of the far-field imaging lens 104B may be greater than the radius ratio between the front of 404 and back end 406 of the near-field imaging lens 104A.

Similarly to the near-field imaging lens 104A, it should be appreciated that, in other embodiments, the far-field imaging lens 104B is embodied by another optical lens based on the requirements of the apparatus and/or a desired cost. For example, in some embodiments, the far-field imaging lens 104B is embodied by a 3-glass lens to achieve high thermal stability, such as to improve focusing and/or performance of the lens at a high range and/or with a high intensity illumination source. In other embodiments, the far-field imaging lens 104B is embodied by a 2-glass 1-plastic optical lens as a lower cost alternative within acceptable performance tradeoffs (e.g., lower thermal stability, but within an acceptable range). In this regard, the specific implementation of the far-field imaging lens 104B may also be dependent on various requirements and/or desired performance metrics that trade-off between various parameters (e.g., optical performance, thermal stability, cost, and the like).

Figure 6A:
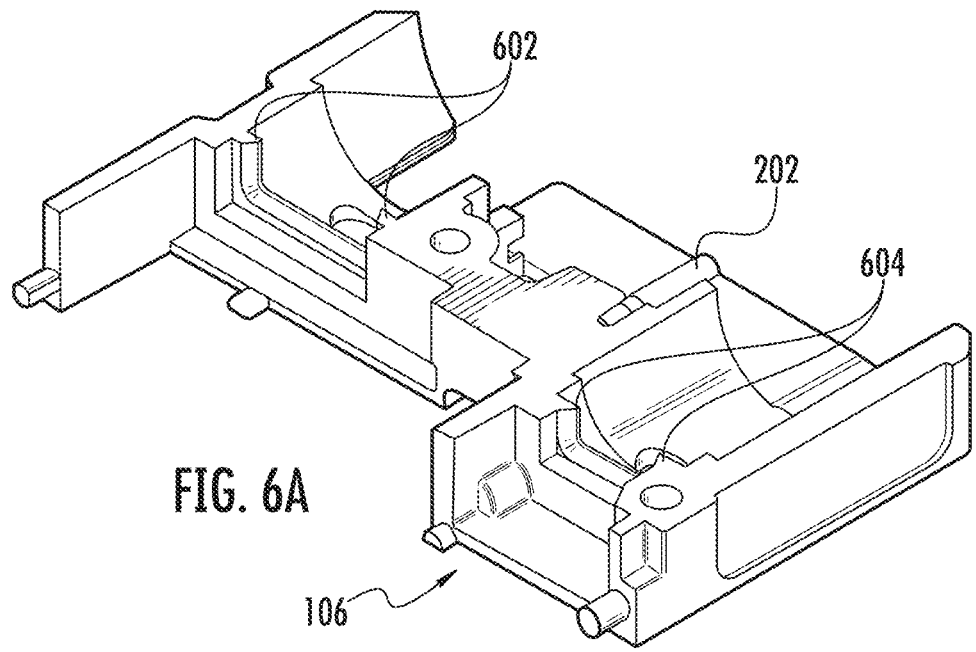
Figure 6B:
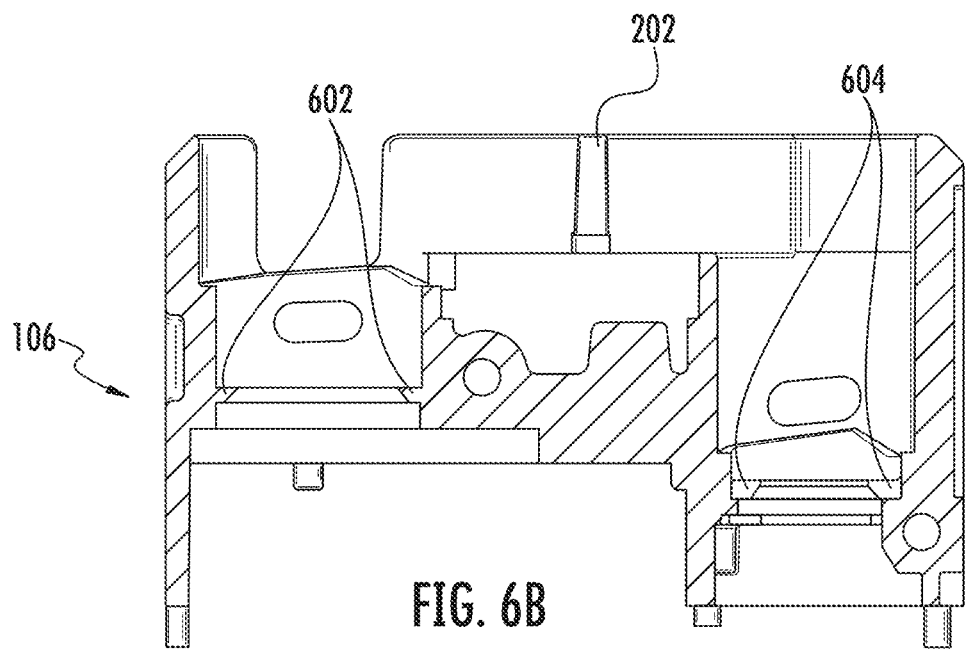
Figure 6C:
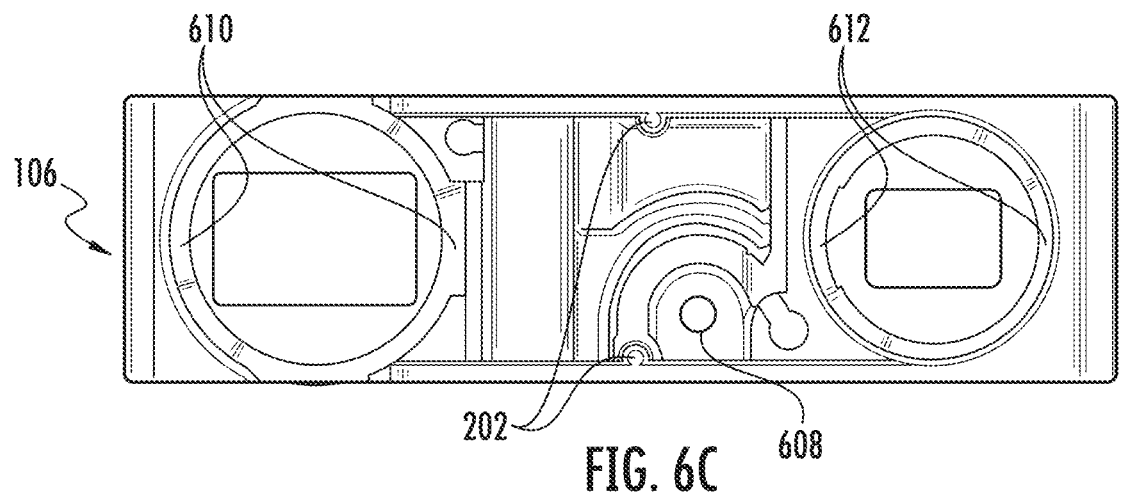
Figure 6D:
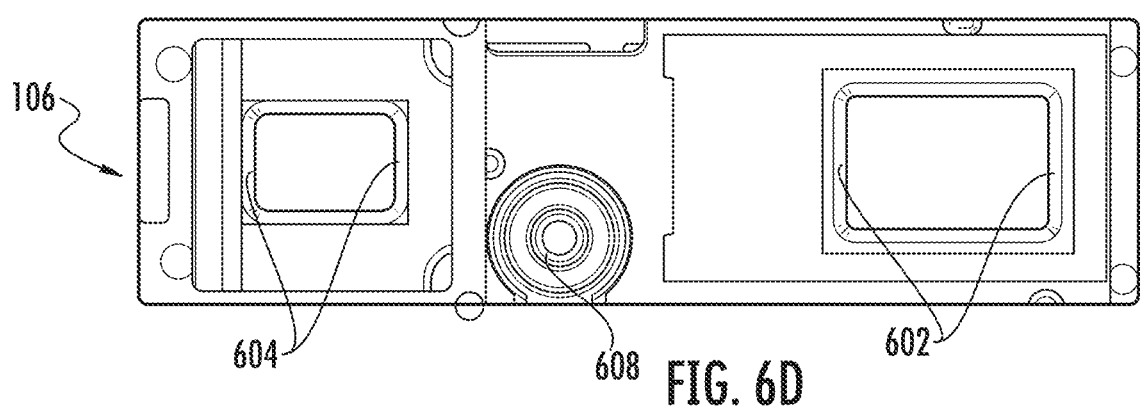

FIGS. 6A-6D illustrate isolated views of the apparatus chassis 106 in accordance with an example embodiment of the present disclosure. Specifically, FIG. 6A illustrates a back-angle cross-sectional view of the apparatus chassis 106. FIG. 6B illustrates a top-down view of the apparatus chassis 106, with the integrated illumination-aimer optics fitting 202 positioned towards the front of the apparatus chassis 106. FIG. 6C illustrates a front-view of the apparatus chassis 106. FIG. 6D illustrates a back-view of the apparatus chassis 106.

The apparatus chassis 106 is designed to house, position, and/or otherwise align various sub-assemblies therein, including a near-field imaging lens, a far-field imaging lens, an integrated illumination-aimer optics, a near-field illuminator source, a far-field illuminator source, an aimer illuminator source (e.g., an aimer source), a near-field imaging sensor, and a far-field imaging sensor. Specifically, as illustrated, the apparatus chassis 106 includes the integrated illumination-aimer fittings 202, including a bottom fitting and a top fitting, for positioning an integrated illumination-aimer optics within the apparatus chassis 106. In this regard, the integrated illumination-aimer optics fitting 202 is configured to enable an integrated illumination-aimer optics, for example integrated illumination-aimer optics 102, to be press-fit within the apparatus chassis 106. By press-fitting the integrated illumination-aimer optics 102, the integrated illumination-aimer optics fittings 202 positions the integrated illumination-aimer optics, and/or all sub-assemblies thereof such as a near-field illumination projection lens, far-field illumination projection lens, aimer pattern projection optics, and/or aimer collimating lens as described above with respect to FIGS. 3A and 3B, within the apparatus chassis 106 and aligns such sub-assemblies with corresponding positioned and/or aligned illuminator sources.

For example, as illustrated, the apparatus chassis 106 comprises a specific housing for an aimer illuminator source, for example an aimer source 110 as depicted and described with respect to FIG. 1. The aimer illuminator source housing may be formed by the aimer source chassis fitting as described above with respect to FIG. 2D. In this regard, the apparatus chassis 106 comprises an aimer aperture 608 such that an aimer illuminator source within the aimer illuminator housing of the apparatus chassis 106 is positioned and aligned to produce light through the aimer aperture 608. Additionally, as illustrated, the aimer aperture 608 of the apparatus chassis 106 is positioned such that when an integrated illumination-aimer optics is positioned and aligned within the apparatus chassis 106, for example using the integrated illumination-aimer optics fittings 202, aimer projection optics (e.g., an aimer collimating lens and aimer pattern projection optics) of the integrated illumination-aimer optics are properly positioned and aligned for receiving light projected through the aimer aperture 608 by the aimer illuminator source (e.g., an aimer source).

The apparatus chassis 106 further includes a near-field lens fitting 610 designed to house a near-field imaging lens, for example the near-field imaging lens 104A. Similarly, the apparatus chassis 106 further includes a far-field lens fitting 612 designed to house a far-field imaging lens, for example the far-field imaging lens 104B. In addition to being configured for aligning the near-field imaging lens and the far-field imaging lens within the apparatus chassis 106, the near-field lens fitting 610 and far-field lens fitting 612 are designed to support lens focusing adjustment by rotating the lens against the ramp fitting features. Matching field aperture baffle rims are also included behind each of the near-field lens fitting 610 and far-field lens fitting 612 to reduce and/or otherwise eliminate undesired light from reaching one or more imaging sensors also housed within the apparatus chassis 106, for example as described below with respect to FIGS. 7 and 8. In this regard, the near-field lens fitting 610 is followed with near-field lens securing rim 602, which functions as a baffle to minimize or prevent light leak between the near-field imaging lens and apparatus chassis. Near-field lens securing rim 602 is positioned near the back end of the housing for the near-field imaging lens, for example to prevent light leakage that occurs between the near-field imaging lens and the apparatus chassis 106. Similarly, far-field lens securing rim 604 is positioned near the back end of the housing for the far-field imaging lens, for example to prevent light leakage that occurs between the far-field imaging lens and the apparatus chassis 106. In this regard, the near-field lens securing rim 602 may be configured to closely match the lens light path size and the shape at the location of the near-field lens securing rim 602, and/or far-field lens securing rim 604 may be configured to closely match the lens light path size and the shape at the location of the far-field lens securing rim 604.

In some such embodiments, the near-field lens securing rim 602 is configured to engage the near-field imaging lens, for example near-field imaging lens 104A, to minimize or eliminate any spacing between the apparatus chassis 106 and the near-field imaging lens. Similarly, in this regard, the far-field lens fitting 612 is followed with far-field lens securing rim 604, which functions as a baffle to minimize or prevent light leak between the far-field imaging lens and the apparatus chassis. Far-field lens securing rim 604 is positioned near the back end of the housing for the far-field imaging lens, for example to prevent light leakage that occurs between the far-field imaging lens and the apparatus chassis 106. In some such embodiments, the far-field lens securing rim 604 is configured to engage the far-field imaging lens, for example far-field imaging lens 104B, to minimize or eliminate any spacing between the apparatus chassis 106 and the far-field imaging lens. As such, in some such embodiments, the far-field lens securing rim 604 and the near-field lens securing rim 602 function as positioning elements, alignment elements, and light leak prevention elements.

Light Leak Prevention Features of Example Embodiments of the Present Disclosure

Having described example embodiments of the apparatus and various components and/or sub-assemblies thereof, further explanation of advantageous features of the example embodiments are further discussed herein. For example, further discussion on preventing negative effects caused by undesired light (e.g., through light leak) are discussed below.

FIG. 7 illustrates an example depiction of light leak that is addressed by some embodiments of the present disclosure. In this regard, the illustrated apparatus includes an integrated illumination-aimer optics 102 positioned between a near-field imaging lens 704A and a far-field imaging lens 704B within an apparatus chassis 702. As depicted and described above, the near-field imaging lens 704A and far-field imaging lens 704B each comprise a reduced radius front end to provide additional volume and to enable positioning of the integrated illumination-aimer optics 102 within the apparatus chassis 702. It should be appreciated that the integrated illumination-aimer optics 102 is positioned and/or aligned with one or more illuminator sources, for example a near-field illuminator source (not depicted) and a far-field illuminator source (not depicted), each configured for projecting one or more illumination patterns.

In this regard, the integrated illumination-aimer optics 102 is positioned closely to the far-field imaging lens 704B and the near-field imaging lens 704A (e.g., with no extra space, or substantially no excess space, between the integrated illumination-aimer optics 102 and the surrounding lenses). The cylindrical shape of the near-field imaging lens 704A and of the far-field imaging lens 704B, and/or the reduced space front end, the gap between the lenses and the apparatus chassis may introduce light leaking, whereas conventional apparatuses utilizing conventional lens fitting methodologies may not be susceptible to such light leaking. Due to the minimal space between the lenses and the apparatus chassis, attempts to fill the gap (e.g., using an opaque adhesive for example) may not be sufficient as the gap area is often too small to effectively access for such purposes. Accordingly, in some such embodiments where light leak affects the functioning of one or more imaging sensors, embodiments must address light leak using alternative methods not applicable to conventional apparatuses.

The close positioning of the various components increases the likelihood that light produced through the integrated illumination-aimer optics 102 interferes with proper light flow via the near-field imaging lens 704A and/or far-field imaging lens 704B. For example, regardless of the minimal space between the near-field imaging lens 704A and the integrated illumination-aimer optics 102, at least some light may still stream between such minimal space. In this regard, light may be reflected and leak between the near-field imaging lens 704A and the integrated illumination-aimer optics 102, as indicated via the light leak indicator 706. Similarly, light may be reflected and leak between the far-field imaging lens 704B and the integrated illumination-aimer optics 102 (not depicted). Similarly, in some embodiments, the intensity of the light projections from the integrated illumination-aimer optics 102 may reflect such that light is reflected towards the front end of the near-field imaging lens 704A and/or far-field imaging lens 704B.

FIG. 8 illustrates one such example of how light produced via the integrated illumination-aimer optics 102 reflects within example embodiments of the present disclosure, for example to cause the light leak described with respect to FIG. 7. As described, the integrated illumination-aimer optics 102 is configured to produce one or more projected patterns, including (for example) a near-field illumination pattern and a far-field illumination pattern. The light produced via the integrated illumination-aimer optics 102 may flow through the apparatus for projecting onto a field, for example to enable 2D barcode scanning within the field. In this regard, in some embodiments, the light produced via the integrated illumination-aimer optics 102 interacts with a protective window 802 and is subsequently projected unto a projection field. The protective window 802 may be embodied by glass and/or plastic to enable the light produced via the integrated illumination-aimer optics 102 to pass through unto the projection field. The protective window 802 may be fixedly secured to a unit housing, for example where the unit housing includes the apparatus depicted in FIG. 8. As a non-limiting example, the unit housing may comprise a mobile device chassis, or other handheld apparatus chassis (e.g., a conventional scanner housing).

However, it should be appreciated that some of the light produced via the integrated illumination-aimer optics 102 may reflect off the protective window 802, as it is nearly impossible to prevent any light from reflecting off the protective window 802. For example, the light produced via the integrated illumination-aimer optics 102 may reflect as indicated by the light reflection indicators 804. In this regard, the produced light may reflect multiple times between the protective window and the integrated illumination-aimer optics 102. Based on the curvature of the sub-assemblies of the integrated illumination-aimer optics 102, it should be appreciated that the various reflections of the produced light may differ, and the light reflection indicators 804 are simplified depictions for purposes of explanation only and not to limit the scope and spirit of the disclosure herein.

As illustrated, the produced light may reflect between the protective window 802 and the integrated illumination-aimer optics 102 until the light interacts with one or more other components of the illustrated apparatus. For example, as illustrated, at least some of the reflected light may be reflected between the near-field imaging lens 704A and the integrated illumination-aimer optics 102, as well as the apparatus chassis 702, leading the light leak described above with respect to light leak indicator 704 depicted in FIG. 7. Additionally or alternatively, at least some of the reflected light may be reflected into the front end of the near-field imaging lens 704A, for example by reflecting off the protective window 802. Preventing such light from entering the lenses and/or light leak between the components of the apparatus is desirable to ensure that imaging sensors associated with each of the lenses 704A and 704B are not improperly and/or negatively affected by such light. In some embodiments, any number of components are positioned and/or configured to minimize light reflection and/or corresponding light leak to an acceptable level. For example, in some embodiments, the apparatus is positioned within an acceptable distance threshold from the protective window 802, the protective window 802 comprises a thickness within an acceptable reflective thickness threshold, one or more additional lens baffles are included in the apparatus chassis to minimize the effects of reflected light, and/or any combination thereof.

Embodiments of the present disclosure implement various example features to minimize and/or prevent such negative effects. For example, by decreasing the front end radius of the near-field imaging lens and far-field imaging lens as compared to the corresponding back end radius of the lenses, embodiments decrease the likelihood that reflected light will enter the lenses and affect the corresponding imaging sensors. Such advantages are provided in addition to enabling sufficient volume for including the integrated illumination-aimer optics 102 within the apparatus. Further, in embodiments that utilize a cylindrical lens shape, the circular front end prevents an uneven distribution of light from entering at corners and/or junctions in the lens construction.

Additionally or alternatively, in some embodiments, the integrated illumination-aimer optics 102 comprises sub-assemblies specifically positioned to reduce the effects of reflected light. For example, as illustrated, the integrated illumination-aimer optics 102 comprises a near-field illumination projection lens 302 and a far-field illumination projection lens 304. The near-field illumination projection lens 302 is positioned adjacent to the far-field imaging lens 704B and further from the near-field imaging lens 704A (e.g., separated by at least the width of the far-field illumination projection lens 304). In this regard, the number of reflections required for the light produced via the near-field illumination projection lens to affect the near-field imaging lens 704A (either through light leak or by entering the lens) increases, decreasing the severity and/or likelihood of negative effects due to such light with each reflection as indicated by the light reflection indicators 804.

Additionally or alternatively, to minimize the effects of such reflected light in causing light leak, the apparatus may include one or more lens securing rims. For example, apparatus chassis 702 may be designed to include a far-field lens securing rim, for example as illustrated and described above with respect to far-field lens securing rim 604, for minimizing and/or otherwise preventing light leak with respect to the far-field imaging lens 704B. Similarly, the apparatus chassis 702 may be designed to include a near-field lens securing rim, for example illustrated and described above with respect to near-field lens securing rim 602, for minimizing and/or otherwise preventing light leak with respect to the near-field imaging lens 704A. In some embodiments, for example where light leak between the far-field imaging lens 704B and the apparatus chassis 702 is minimal or determined not to cause negative effects, the apparatus chassis 702 may only comprise a near-field lens securing rim.

Additionally or alternatively, in some embodiments, the protective window 802 is coated with an anti-reflective coating to minimize the light that is reflected off the protective front window 802. Such an anti-reflective coating may be utilized to minimize the intensity of light that is reflected off the protective window 802. Additionally or alternatively yet, in some embodiments, the integrated illumination-aimer optics 102 and/or one or more sub-assemblies thereof, are coated with an anti-reflective coating to minimize the intensity of light that is reflected off the integrated illumination-aimer optics 102. For example, in some embodiments, the entirety of the integrated illumination-aimer optics 102 is coated in an anti-reflective coating. In other embodiments, at least the far-field illumination projection lens, for example the far-field illumination projection lens 304, is coated in an anti-reflective coating. In some embodiments, the protective window 802 and/or integrated illumination-aimer optics 102 are coated with an anti-reflective coating to control the effects of reflected light to within an acceptable level (e.g., below a threshold intensity of undesired light that impacts a corresponding imaging sensor). In some embodiments, the acceptable level is determined based on the relative ratio of the working signal level produced by the apparatus as compared to the unwanted reflection contribution, for example where the relative ratio must be equal to or greater than a desired threshold (e.g., the working signal level is 10 times higher).

Example Visualizations for Alignment Improvement Provided by Embodiments of the Present Disclosure FIGS. 9A and 9B illustrate example visualizations of alignment improvement provided by embodiments of the present disclosure. Specifically, FIGS. 9A and 9B illustrate the improvement in projected pattern alignment due to irreparable offset between the components of dual-projector or multi-projector imaging apparatuses. It should be appreciated that FIGS. 9A and 9B are provided for illustrative purposes and are not necessarily drawn to scale.

FIG. 9A illustrates example projected pattern alignment in prior art imaging apparatuses. Specifically, FIG. 9A includes an aimer pattern 902A, an image area 904A, and an illumination pattern 906A. In this regard, the aimer pattern 902A may be projected via one or more components of a prior art apparatus, for example a laser and associated separate aimer pattern projecting optics for projecting the aimer pattern 902A. Similarly, the illumination pattern 906A may be projected via one or more other components of the prior art apparatus, for example a light generation component (e.g., a LED) and associated independent illumination pattern projecting optics, for projecting the illumination pattern 906A. The image area 904A may represent the visible area associated with particular imaging optics, for example a near-field imaging lens and/or far-field imaging lens, of the prior art apparatus.

To minimize errors in capturing and/or analyzing images of the projection field, it is desirable for the aimer pattern 902A, image area 904A, and illumination pattern 906A to be as aligned as possible. In this regard, the aimer pattern 902A, image area 904A, and illumination pattern 906A should be centered at the same point, or as closely as possible. As illustrated, the aimer pattern 902A, image area 904A and illumination pattern 906A are grossly misaligned. The depicted alignment is due to irreparable offset between the various components of the prior art apparatus. In such prior art apparatuses, the projections are offset dependent on the physical spacing between the various components of the apparatus. Such spacing is fixed, and thus the corresponding misalignment results even when each component properly positioned and aligned. In this regard, it should be appreciated that the irreparable offset caused by such misalignment cannot be calibrated at all distances (e.g., for a far-field and a near-field). In this regard, even when an apparatus is calibrated for a particular intended distance, such calibration does not control for other distances (e.g., the irreparable offset between components will result in a projection mismatch that is more noticeable at certain distances).

FIG. 9B illustrates example projected pattern alignment in embodiment imaging apparatuses utilizing an integrated illumination-aimer optics. In this regard, as described above, the integrated illumination-aimer optics enables significant volume saving within the apparatus chassis of such embodiments. This volume saving enables components of such embodiments to be placed in close proximity to one another, with various components overlapping to minimize offsets between the components therein.

As such, the illustrated alignment includes aimer pattern 902B, image area 904B, and illumination pattern 906B. Due to the components being located in closer proximity to one another in embodiments herein, the produced projections are significantly better aligned as compared to those of prior art apparatuses. It should be appreciated that by decreasing the irreparable offset due to such component spacing, embodiments of the present disclosure further minimize the likelihood of misalignment resulting in an error.

Additional Embodiments of the Present Disclosure

Embodiments of the present disclosure may be utilized into any of a number of contexts. For example, embodiment dual-projector and/or multi-projector imaging apparatuses may be integrated into one or more scanning devices, for example barcode scanners and/or dimensioners. It should be appreciated that, in some embodiments where desired, such devices may be reduced in size in accordance with the decreased size of imaging apparatuses utilizing an integrated illumination-aimer optics, as described herein.

In other embodiments, an integrated illumination-aimer imaging apparatus as described herein is integrated within an apparatus having a smaller shell. For example, the integrated illumination-aimer imaging apparatus 100 as described herein, is integrated into a mobile integrated illumination-aimer imaging apparatus. FIGS. 10A-10C illustrate various views of a mobile integrated illumination-aimer imaging apparatus 1000. Specifically, FIG. 10A illustrates an angle view of the mobile integrated illumination-aimer imaging apparatus 1000. FIG. 10B illustrates a view of the top of the mobile integrated illumination-aimer imaging apparatus 1000. FIG. 10C illustrates a view of the side of the mobile integrated illumination-aimer imaging apparatus 1000.

As illustrated, the mobile integrated illumination-aimer imaging apparatus 1000 comprises a mobile device chassis 1002. The mobile device chassis 1002 is depicted as semi-transparent for purposes of illustration. It should be appreciated that, in various embodiments, the mobile device chassis 1002 may be embodied by any of a number of materials known for use in designing mobile device chasses. Additionally or alternatively, it should be appreciated that the mobile device chassis 1002 may include additional known mobile device computing hardware and/or other sub-systems (not depicted) for providing various mobile device functionality.

The mobile device chassis 1002 houses the integrated illumination-aimer imaging apparatus 100, for example positioned at the top of the mobile device chassis 1002 as depicted. In this regard, the integrated illumination-aimer imaging apparatus 100 is integrated within the mobile device chassis 1002 for functioning as an edge-facing imaging apparatus. In other embodiments, it should be appreciated that the integrated illumination-aimer imaging apparatus 100 may be integrated within the mobile device chassis 1002 for functioning as a back-facing imaging apparatus. The decreased apparatus size of the integrated illumination-aimer imaging apparatus 100 enables such positioning within the mobile device chassis 1002 without requiring the mobile device chassis 1002 be expanded, which enables the mobile device chassis 1002 to remain conventionally sized. Additionally, in some embodiments, the integrated illumination-aimer imaging apparatus 100 is integrated with additional custom circuitry and/or computing hardware (not depicted) housed by the mobile device chassis 1002 for further processing the captured and/or processed data. Alternatively or additionally, in some embodiments, the integrated illumination-aimer imaging apparatus 100 is integrated with processing circuitry and/or conventional computing hardware of the mobile integrated illumination-aimer imaging apparatus 1000 (e.g., a CPU and/or memory via a bus) for further processing the captured and/or processed data.

CONCLUSION

It should be appreciated that the example implementations described herein are each non-limiting examples of various embodiments of the present disclosure. In this regard, one or more enhancements implemented in the various embodiments may be provided in any combination. Additionally or alternatively, in some embodiments, one or more components may be provided with modifications as described herein.

For example, some embodiments may provide for any number of illumination pattern projection optics and/or corresponding imaging optics. In this regard, other embodiments of the present disclosure may include an integrated illumination-aimer optics comprising aimer projection optics (e.g., a collimator and pattern projection lens) and three or more illumination projection lenses, each corresponding to a particular illuminator source. In this regard, the integrated illumination-aimer optics of such embodiments may embody a different shape dependent on the number of corresponding illumination projection lenses thereof. It should be appreciated that the advantages and teachings of the disclosure herein provide significant advantages in such multi-projector apparatuses, for example with respect to the positioning of the near-field illumination pattern projection lens and/or corresponding near-field imaging lens within such apparatuses, securing rims and/or baffles for preventing light leak within embodiment apparatuses, and/or coating of one or more components for preventing negative effects from undesirable (e.g., reflected) light.

The embodiments disclosed have been described with certain example configurations and/or implementation details. It should be appreciated that in other embodiments, for example, components may be embodied by other materials known in the art for creating such components and/or structural equivalents. Further, it should be appreciated that embodiments may include any number of known structural elements, or utilize known methodologies, for securing the components and/or sub-components thereof (e.g., for securing one or more LEDs, or other components, to a circuit board or other printed circuit board) without deviating from the scope and spirit of the disclosure.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An apparatus comprising:
a near-field imaging lens and a far-field imaging lens;
an integrated illumination-aimer optics;
at least one illuminator source aligned with the integrated illumination-aimer optics;
a near-field imaging sensor aligned with the near-field imaging lens;
a far-field imaging sensor aligned with the far-field imaging lens; and
an apparatus chassis that aligns the near-field imaging lens with the near-field imaging sensor and aligns the far-field imaging lens with the far-field imaging sensor.

2. The apparatus of claim 1, wherein the integrated illumination-aimer optics comprises a near-field illumination projection lens positioned adjacent to the far-field imaging lens, and a far-field illumination projection lens positioned adjacent to the near-field imaging lens.

3. The apparatus of claim 1, wherein the integrated illumination-aimer optics comprises a near-field illumination projection lens positioned adjacent to the far-field imaging lens, a far-field illumination projection lens positioned adjacent to the near-field imaging lens, and aimer pattern projection optics.

4. The apparatus of claim 1, wherein the apparatus chassis comprises a near-field lens securing rim for engaging the near-field imaging lens.

5. The apparatus of claim 1, wherein the apparatus chassis comprises a far-field lens securing rim for engaging the far-field imaging lens.

6. The apparatus of claim 1, wherein the near-field imaging lens comprises a front end and aback end, wherein the front end of the near-field imaging lens is associated with a near-field lens front end radius, wherein the back end of the near-field imaging lens is associated with a near-field lens back end radius, and wherein the near-field lens front end radius is smaller than the near-field lens back end radius.

7. The apparatus of claim 1, wherein the far-field imaging lens comprises a front end and a back end, wherein the front end of the far-field imaging lens is associated with a far-field lens front end radius, wherein the back end of the far-field imaging lens is associated with afar-field lens back end radius, and wherein the far-field lens front end radius is smaller than the far-field lens back end radius.

8. The apparatus of claim 1, wherein the integrated illumination-aimer optics is coated with an anti-reflective coating.

9. The apparatus of claim 1, wherein the apparatus chassis is fixedly positioned within a mobile device chassis.

10. The apparatus of claim 1, the apparatus further comprising:
an aimer source integrated with the apparatus chassis to align the aimer source with the integrated illumination-aimer optics.

11. The apparatus of claim 1, wherein the integrated illumination-aimer optics comprises a near-field illumination projection lens associated with a first defined curvature, and a far-field illumination projection lens associated with a second defined curvature.

12. The apparatus of claim 1, wherein the at least one illuminator source comprises at least one LED.

13. The apparatus of claim 1, wherein the at least one illuminator source projects, via the integrated illumination-aimer optics, a near-field illumination pattern associated with a near-field illumination pattern projection size or a far-field illumination pattern associated with afar-field illumination pattern projection size.

14. The apparatus of claim 1, wherein the at least one illuminator source the near-field imaging sensor, and the far-field imaging sensor are fixedly attached to a printed circuit board that interlocks with the apparatus chassis for positioning and alignment.

15. The apparatus of claim 1, the apparatus further comprising:
a protective window secured to the apparatus chassis, the protective window positioned in front of the near-field imaging lens, the far-field imaging lens, and the integrated illumination-aimer optics.

16. The apparatus of claim 15, wherein the protective window is coated with an anti-reflective coating.

17. An apparatus chassis comprising:
a near-field lens securing rim that receives a near-field imaging lens;
a far-field lens securing rim that receives a far-field imaging lens,
wherein the near-field lens securing rim aligns the near-field imaging lens with a near-field imaging sensor, wherein the far-field lens securing rim aligns the far-field imaging lens with a far-field imaging sensor; and
one or more illumination-aimer optics fittings that receives an integrated illumination-aimer optics.

18. The apparatus chassis of claim 17, wherein the near-field lens securing rim secures the near-field imaging lens at least a threshold distance from the far-field imaging lens, and the one or more illumination-aimer optics fittings secure the integrated illumination-aimer optics between the near-field imaging lens and the far-field imaging lens.

\* \* \* \* \*